United States Patent
Halbritter et al.

(10) Patent No.: US 7,882,033 B2
(45) Date of Patent: Feb. 1, 2011

(54) SYSTEMS AND METHODS FOR PROVIDING COMMUNICATION SERVICES TO GUESTS AT A HOSPITALITY FACILITY

(75) Inventors: Arthur R. Halbritter, Canastota, NY (US); Frank J. Riolo, Rome, NY (US); Craig A. Clark, Manlius, NY (US); Susan K. Kesel, Oneida, NY (US); Robert C. Angell, West Greenwich, RI (US); Edward J. Hole, Portsmouth, RI (US)

(73) Assignee: Oneida Indian Nation, Oneida, NY (US)

( * ) Notice: Subject to any disclaimer, the term of this patent is extended or adjusted under 35 U.S.C. 154(b) by 842 days.

(21) Appl. No.: 11/475,042

(22) Filed: Jun. 27, 2006

(65) Prior Publication Data

US 2007/0038570 A1 Feb. 15, 2007

Related U.S. Application Data

(63) Continuation-in-part of application No. 09/689,842, filed on Oct. 13, 2000, now Pat. No. 7,801,736, which is a continuation-in-part of application No. 08/877,375, filed on Jun. 17, 1997, now Pat. No. 6,280,328, which is a continuation-in-part of application No. 08/719,651, filed on Sep. 25, 1996, now Pat. No. 5,674,128.

(51) Int. Cl.
 *G06F 21/00* (2006.01)
(52) U.S. Cl. .............................. 705/50; 705/64; 705/75
(58) Field of Classification Search .................. 705/50, 705/64, 75
 See application file for complete search history.

(56) References Cited

U.S. PATENT DOCUMENTS

| 4,240,635 | A | 12/1980 | Brown |
| 4,283,709 | A | 8/1981 | Lucero et al. |
| 4,335,809 | A | 6/1982 | Wain |
| 4,339,798 | A | 7/1982 | Hedges et al. |
| 4,359,631 | A | 11/1982 | Lockwood et al. |
| 4,467,424 | A | 8/1984 | Hedges et al. |
| 4,494,197 | A | 1/1985 | Troy et al. |

(Continued)

FOREIGN PATENT DOCUMENTS

EP 0769769 A1 4/1997

(Continued)

OTHER PUBLICATIONS

"Pot-O-Gold", *19" Touchscreen Multi-Game Terminal Toucheasy Keno Play Description* (2 pages).

(Continued)

*Primary Examiner*—Pierre E Elisca
(74) *Attorney, Agent, or Firm*—DeLizo Gilliam, PLLC

(57) ABSTRACT

Systems and methods consistent with the present invention allow guests at a hospitality facility to communicate via VoIP from a remote terminal. For example, guests at a client terminal can place and receive phone calls, experience content, and receive targeted messages while continuing to play games at the client terminal. Based on the stored guest preference information, hospitality facility operators can selectively target information to each guest.

32 Claims, 12 Drawing Sheets

U.S. PATENT DOCUMENTS

| | | |
|---|---|---|
| 4,575,622 A | 3/1986 | Pellegrini |
| 4,636,951 A | 1/1987 | Harlick |
| 4,648,600 A | 3/1987 | Olliges |
| 4,669,730 A | 6/1987 | Small |
| 4,760,527 A | 7/1988 | Sidley |
| 4,815,741 A | 3/1989 | Small |
| 4,856,787 A | 8/1989 | Itkis |
| 4,880,237 A | 11/1989 | Kishishita |
| 4,882,473 A | 11/1989 | Bergeron et al. |
| 4,926,327 A | 5/1990 | Sidley |
| 4,994,908 A | 2/1991 | Kuban et al. |
| 5,038,022 A | 8/1991 | Lucero |
| 5,119,295 A | 6/1992 | Kapur |
| 5,159,549 A | 10/1992 | Hallman, Jr. et al. |
| 5,179,517 A | 1/1993 | Sarbin et al. |
| 5,197,094 A | 3/1993 | Tillery et al. |
| 5,223,698 A | 6/1993 | Kapur |
| 5,235,509 A | 8/1993 | Mueller et al. |
| 5,259,613 A | 11/1993 | Marnell, II |
| 5,265,874 A | 11/1993 | Dickinson et al. |
| 5,287,269 A | 2/1994 | Dorrough et al. |
| 5,297,802 A | 3/1994 | Pocock et al. |
| 5,324,035 A | 6/1994 | Morris et al. |
| 5,326,104 A | 7/1994 | Pease et al. |
| 5,332,076 A | 7/1994 | Ziegert |
| 5,371,345 A | 12/1994 | LeStrange et al. |
| 5,408,417 A | 4/1995 | Wilder |
| 5,429,361 A | 7/1995 | Raven et al. |
| 5,470,079 A | 11/1995 | LeStrange et al. |
| 5,506,587 A * | 4/1996 | Lans .................... 342/357.09 |
| 5,524,288 A | 6/1996 | Heidel |
| 5,581,461 A | 12/1996 | Coll et al. |
| 5,613,912 A | 3/1997 | Slater |
| 5,655,961 A | 8/1997 | Acres et al. |
| 5,674,128 A | 10/1997 | Holch et al. |
| 5,722,890 A | 3/1998 | Libby et al. |
| 5,732,398 A | 3/1998 | Tagawa |
| 5,755,621 A | 5/1998 | Marks et al. |
| 5,761,647 A | 6/1998 | Boushy |
| 5,762,552 A | 6/1998 | Vuong et al. |
| 5,770,533 A | 6/1998 | Franchi |
| 5,797,794 A | 8/1998 | Angell |
| 5,800,269 A | 9/1998 | Holch et al. |
| 5,823,879 A | 10/1998 | Goldberg et al. |
| 5,830,067 A | 11/1998 | Graves et al. |
| 5,830,068 A | 11/1998 | Brenner et al. |
| 5,830,069 A | 11/1998 | Soltesz et al. |
| 5,836,817 A | 11/1998 | Acres et al. |
| 5,857,911 A | 1/1999 | Fioretti et al. |
| 5,901,211 A | 5/1999 | Dean et al. |
| 5,917,725 A | 6/1999 | Thacher et al. |
| 5,919,091 A | 7/1999 | Bell et al. |
| 5,949,411 A | 9/1999 | Doerr et al. |
| 5,971,271 A | 10/1999 | Wynn et al. |
| 5,971,849 A | 10/1999 | Falciglia |
| 5,978,770 A | 11/1999 | Waytena et al. |
| 5,984,779 A | 11/1999 | Bridgeman et al. |
| 5,987,421 A * | 11/1999 | Chuang ........................ 705/7 |
| 6,024,640 A | 2/2000 | Walker et al. |
| 6,039,648 A | 3/2000 | Guinn et al. |
| 6,049,823 A | 4/2000 | Hwang |
| 6,089,982 A | 7/2000 | Holch et al. |
| 6,093,100 A | 7/2000 | Singer et al. |
| 6,101,477 A | 8/2000 | Hohle et al. |
| 6,110,041 A | 8/2000 | Walker et al. |
| 6,113,495 A | 9/2000 | Walker et al. |
| 6,120,024 A | 9/2000 | Lind |
| 6,264,560 B1 | 7/2001 | Goldberg et al. |
| 6,269,446 B1 * | 7/2001 | Schumacher et al. ........ 713/176 |
| 6,508,709 B1 | 1/2003 | Karmarkar |

| | | |
|---|---|---|
| 2002/0166126 A1 | 11/2002 | Pugh |

FOREIGN PATENT DOCUMENTS

| | | |
|---|---|---|
| WO | WO-97/44750 | 11/1997 |
| WO | WO-0231739 | 4/2002 |

OTHER PUBLICATIONS

"Pot-O-Gold", *19" Touchscreen Multi-Game Terminal Superpick Lotto Play Description* (2 pages).

Samboy, T. B., "letter to Carl Conti", (2 pages), (Jun. 13, 1994).

Samboy, T. B., "letter to Hon. Richard F. Corbisiero, Jr.", "*Recommendations Concerning Instant Keno*" (7 pages), (Jun. 14, 1994).

Smith, Katherine A., "letter to Hon. James R. Hurley", "*Imagineering Computerized Keno System*" (4 pages), (Jun. 15, 1994).

Minder, Jacqueline L., "letter to Ron Mach", (1 page), (Jun. 20, 1994).

Conti, Carl "letter to Bruce T. Samboy", (2 pages), (Jun. 27, 1994).

Samboy, Bruce T., "letter to Carl Conti", "*Imagineering—Instant Keno and Gaming Enterprise Registration*" (2 pages), (Jul. 1, 1994).

Holch, Niels C., "letter to Hon. Richard F. Corbisiero, Jr.", (1 page), (Jul. 12, 1994).

Corbisiero, Jr., Richard F., "letter to Niels C. Holch", (1 page), (Jul. 14, 1994).

"High-Tech Gambling Debuts at Turning Stone", *Syracuse Post Standard* (1 page), (Feb. 27, 1995).

Gatley, Susan "Turning Stone Inter-Office Memorandum to Bong Woo", *re Instant Keno Issues* (3 pages), (Oct. 17, 1994).

"Turning Stone Inter-Office Memorandum to Bruce Samboy re Instant Keno", *Observations and Recommendations*, dated Nov. 8, 1994 (2 pages), (Nov. 8, 1994).

"Standing Stone Gaming: Open Gaming Protocol (OGP) Specification", *Integrated Performance Decisions, Version 2.1*, (Apr. 5, 1999), 1-58.

Banks, Michael A., "America Online: A Graphics-Based Success", *Link-UP*, (Feb. 1992),pp. 12, 14 and 15.

"GlobeSpan Technology Partners Releases Totemaster™??, Its OnLine Pari-Mutual Totalization System", *PR Newswire*, New York, (Feb. 22, 2000), 1-3.

"Pot-O-Gold", *19" Touchscreen Multi-Game Terminal Touch 6 Lotto Play Description* (2 pages).

"Pot-O-Gold", *19" Touchscreen Multi-Game Terminal Touch 6 Lotto Technical Description* (1 page).

"Pot-O-Gold", *19- Touchscreen Multi-Game Terminal Supergold Bingo Play Description* (2 pages).

"Casinolink", *Mikohn Worldwide* (4 pages).

"Casinolink System", *Mikohn WorldWide* (8 pages).

"QuickTrack", *Quick Track Gaming, Inc.* (44 pages).

"Oasis II", *CDS Systems and Services*.

"The Future of Gaming Today", *Casino Data Systems* (6 pages).

"Welcome to Casino Data Systems", *Casino Data Systems* (5 pages).

"Software Offerings, Advanced Computer Services", (8 pages).

"SafeJack", *Mikohn WorldWide* (15 pages).

"Casino Systems Solutions", *IGT International Game Technology*, (1997).

"Introducing a World of Opportunities, Bally Systems", *Bally Systems*.

Yerak, Becky "At Cashless Slots: You've got mail, and a jackpot", *USA Today*, (Nov. 13, 2000),2E.

Monteau, Harold "National Gaming Indian Commission".

Washburn, Kevin K., "National Gaming Indian Commission".

"*AT&T Corp. v. Coeur D'Alene Tribe*, 45 F. Supp. 2d 995 (D. Idaho 1998)", (1998).

"S. 692, 106th Congress. 1st Session".

"H.R. 3125: 106th Congress, 2d Session".

"Amendment in the Nature of a Substitute H.R. 3125, Offered by Mr. Goodlatte of Virginia".

"Instant Keno Specification", *multiple drafts captioned "Keno" and "Instant Keno,"* undated (38 pages).

"Instant Keno—Cashless Automated Keno Writer Stations", *Imagineering Systems, Inc.* undated (6 pages).

"The Keno People", *Imagineering Systems, Inc.*, undated (2 pages).

Samboy, T. B., "letter to Hon. Richard F. Corbisiero, Jr.", *Review of Instant Keno* (6 pages), (Jun. 1, 1994).
"U.S. Appl. No. 11/475,042, Examiners Answer mailed Dec. 11, 2008".
"U.S. Appl. No. 11/475,042, Final Office Action mailed Oct. 18, 2007".
"U.S. Appl. No. 11/475,042, Non-Final Office Action mailed Apr. 6, 2007".

"PCT Application No. PCT/US01/42738, International Preliminary Examination Report", Apr. 15, 2003.
"PCT Application No. PCT/US01/42738, International Search Report", Jan. 15, 2002.
"U.S. Appl. No. 09/689,842 Non-Final Office Action", Apr. 6, 2007.
"U.S. Appl. No. 09/689,842 Final Office Action", Oct. 18, 2007.

* cited by examiner

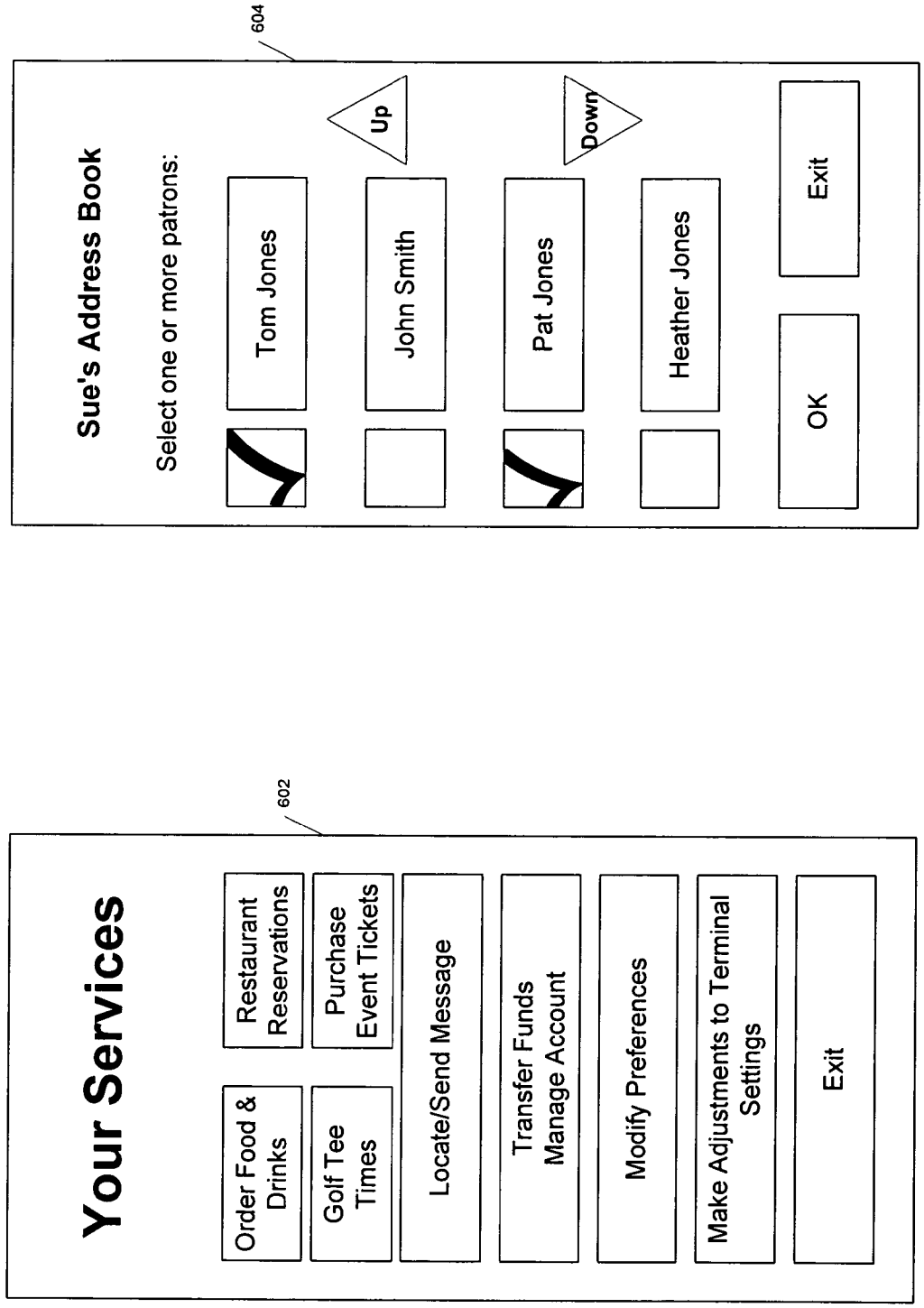

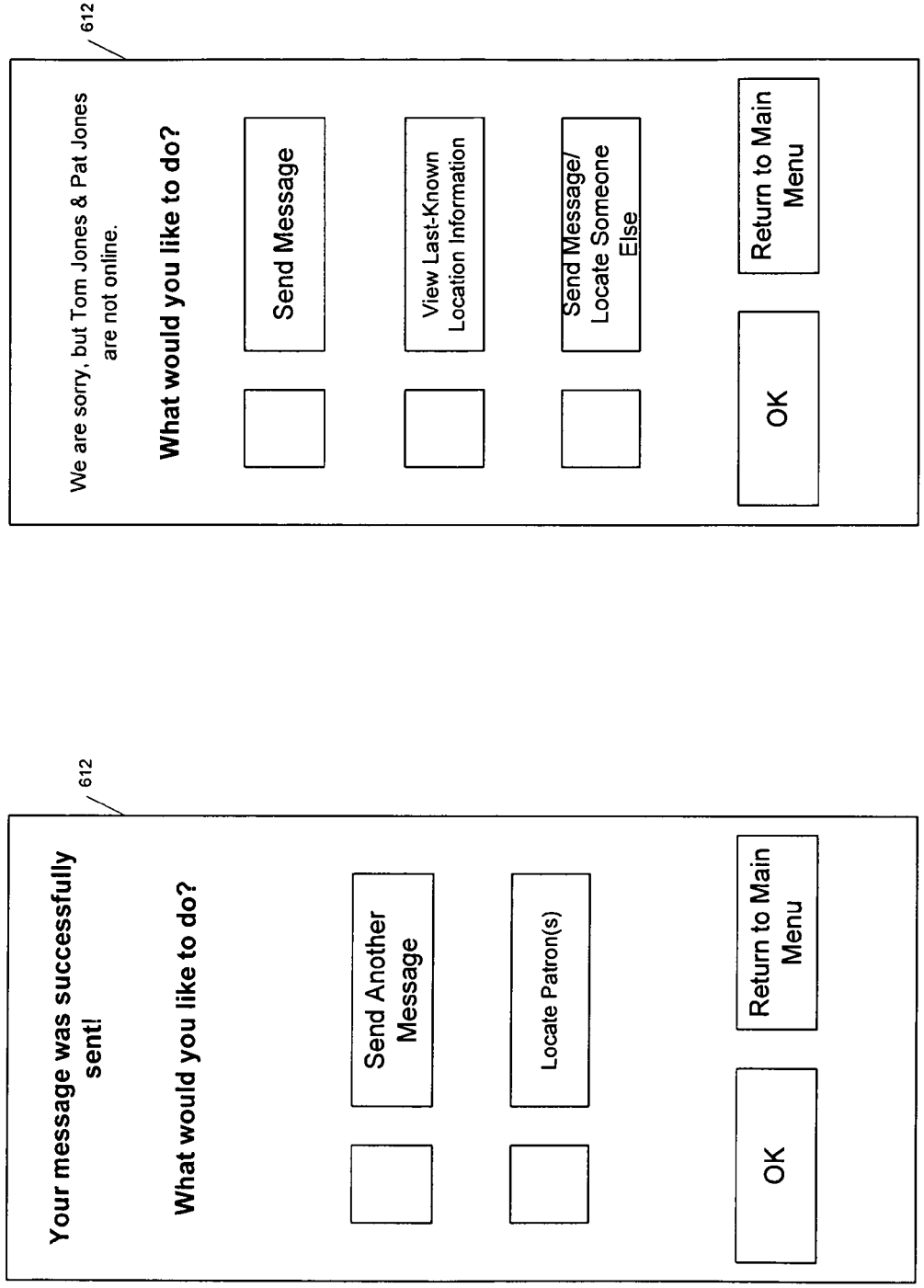

For the next 8 hours, a message will be sent to Tom Jones instructing Tom to contact you!

What would you like to do?

[ ] Send Another Message

[ ] Locate Patron(s)

OK | Return to Main Menu

Would you like us to send a Message to Tom Jones instructing Tom to contact you when Tom is back on-line?

[ ] Send for 8 Hours

[ ] Send for 24 Hours

[ ] Send for 48 Hours

OK | Don't Send

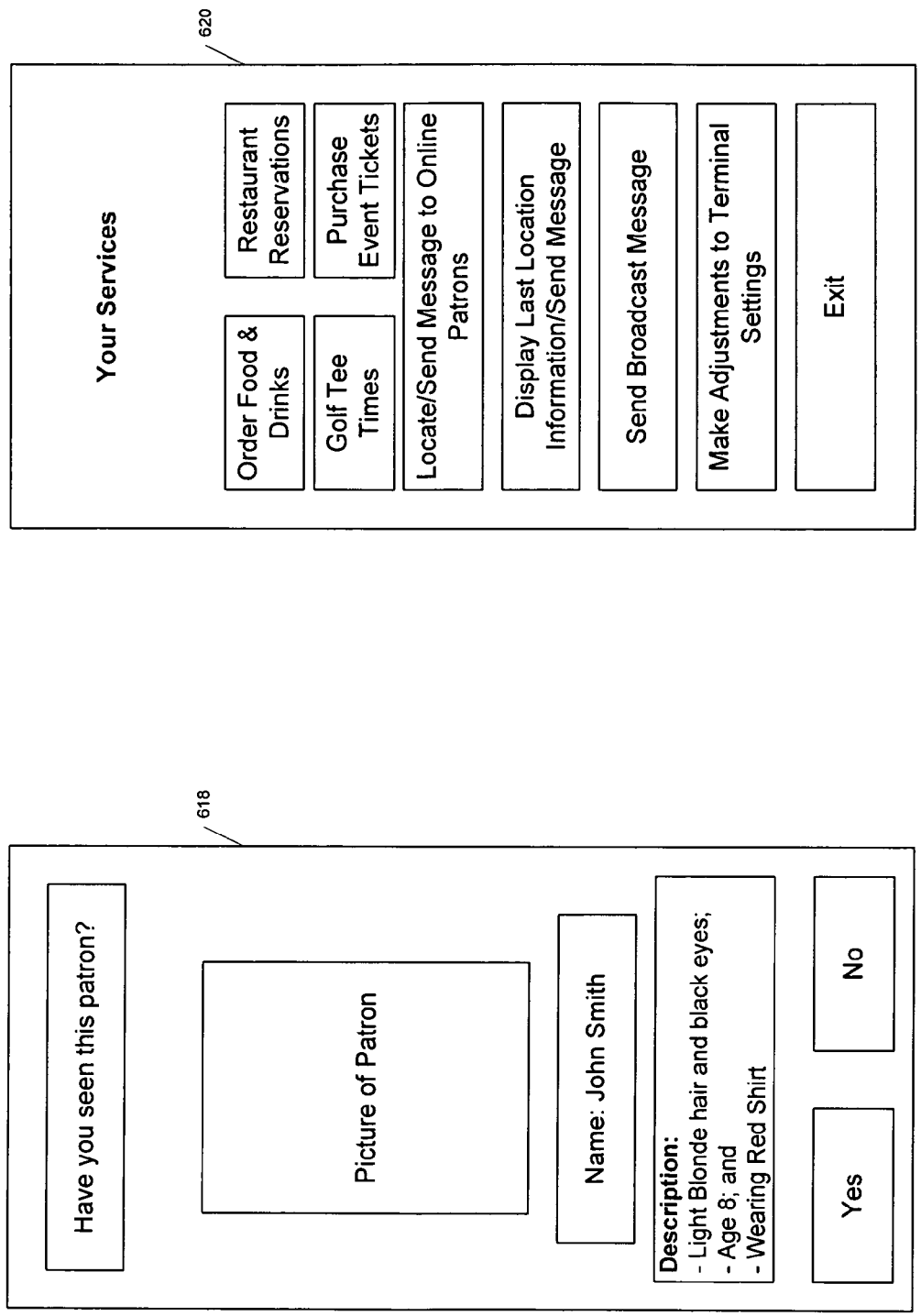

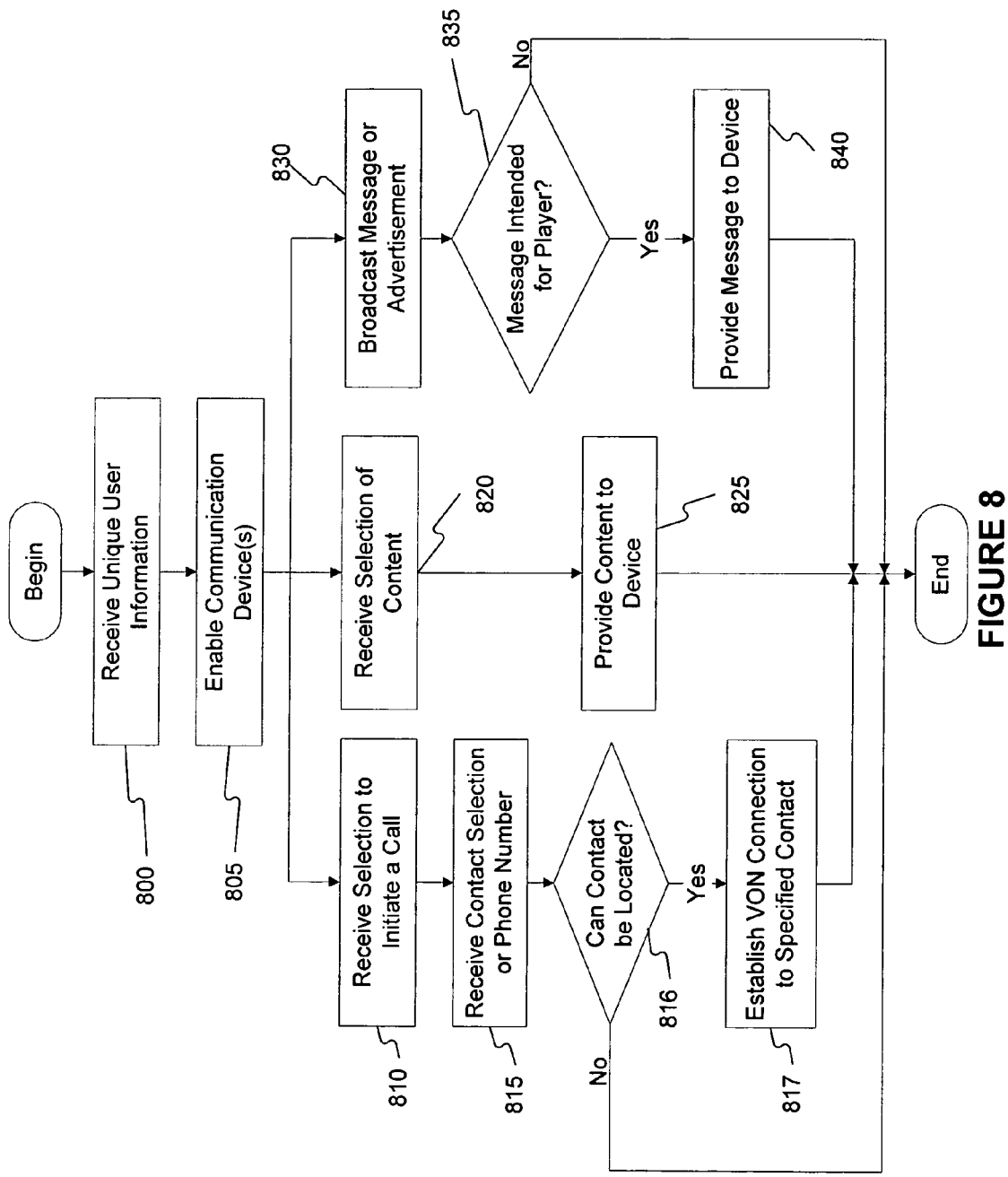

SYSTEMS AND METHODS FOR PROVIDING COMMUNICATION SERVICES TO GUESTS AT A HOSPITALITY FACILITY

RELATED APPLICATIONS

This application is a continuation-in-part of U.S. patent application Ser. No. 09/689,842, filed Oct. 13, 2000 now U.S. Pat. No. 7,801,736. This application is related to U.S. patent application Ser. No. 09/488,556, filed Jan. 21, 2000, which is a continuation-in-part of U.S. patent application Ser. No. 08/877,375, filed Jun. 17, 1997, now U.S. Pat. No. 6,280,328, which is a continuation-in-part of U.S. patent application Ser. No. 08/719,651, filed Sep. 25, 1996, now U.S. Pat. No. 5,674,128. This application is also related to U.S. patent application Ser. No. 09/689,841, filed Oct. 13, 2000. The contents of these U.S. patent applications and patents are hereby incorporated by reference.

BACKGROUND OF THE INVENTION

This invention relates generally to the field of interactive computer systems, and more particularly to a system and method for use in a hospitality facility enabling communication and an individualized content experience.

Most hospitality facilities, such as hotels, motels, amusement parks, theme parks, casinos, and resorts, face many common problems associated with not being able to locate or communicate with their patrons, such as guests. These problems may result in lost revenues for the hospitality facilities and in an inconvenience for patrons.

One problem is that a patron who wants to communicate with another person, such as a spouse or a friend, may not be able to do so easily. For example, in a casino, a husband and a wife may play a different game at two different player terminals located at the opposite ends of the casino. If, for example, the husband wants to ask his wife to meet him in the lobby in five minutes, the only way to do this may be to physically search for and locate his wife. This not only inconveniences the patrons, but is bad for business. Casinos want to keep patrons at the player terminals as long as possible to maximize revenues and patron gaming time.

Hospitality facilities also face the problem of finding lost patrons. For example, in an amusement park, if a child is lost, the parent or a hospitality facility employee may have to physically search for the child, which may be time consuming, difficult, and cause lost revenues. In addition, the hospitality facility may also want to communicate with patrons to inform them about the status of an event, or offer a promotion. For example, in a casino, a patron typically plays both offline games, such as keno, and online games, such as player terminals. To maximize gaming time and entertainment value, a patron may buy a keno ticket and then, go play at a player terminal. After a few minutes, however, the patron may have to interrupt play at the player terminal to obtain the results of the keno game. The patron may have to walk to the keno game area to obtain these results. This frustrates the casinos desire to keep patrons at the player terminals as long as possible and inconveniences the patrons.

In addition, a hospitality facility would like to provide a comfortable atmosphere to encourage a guest to continue to play at a game terminal or remain within the hospitality facility. Providing a guest with access to content (e.g., audio or video broadcasts) may provide additional entertainment for some players, while creating a welcome distraction for others. However, delivery of such content has typically been limited to centralized systems where one or several outputs are available to all guests within a particular area. Such an arrangement is unable to cater to the desires of each of the many guests within a hospitality facility and may actually have the effect of causing some players to leave an area or game terminal due to a dislike of the currently available content. Allowing guests access to individually selected content and conversation features has the benefit of enhancing a player experience and therefore encouraging the player to remain at a game terminal or within the hospitality facility.

SUMMARY OF THE INVENTION

Both the foregoing general description and the following detailed description are exemplary and explanatory, and are intended to provide further explanation of the claimed invention.

One embodiment consistent with the present invention includes a method for providing communication services for a guest at a hospitality facility including a network, a server, and a plurality of terminals. The method includes the steps of receiving a guest identifier associated with the guest; authenticating the guest using the guest identifier; receiving, from the guest via a first of the plurality of terminals, contact information associated with a contact; determining a connection method based on the contact information; and after the guest has been authenticated, establishing, based on the connection method and the contact information, a connection between the first terminal and the contact, wherein the connection is configured to transmit sound information.

Another embodiment consistent with the present invention includes a method for providing content to a guest within a hospitality facility including a network, a server, and a plurality of terminals. The method includes the steps of receiving a guest identifier generated by the hospitality facility and associated with the guest; receiving a content selection from the guest; determining whether the guest is authorized to receive the selected content; when it is determined that the guest is authorized, transmitting the selected content, via a voice over network protocol, to a terminal within the hospitality facility based on the content selection; and outputting the selected content to an output device at the terminal.

Yet another embodiment consistent with the present invention includes a method for providing targeted content to a guest within a hospitality facility including a network, a server, and a plurality of terminals. The method includes the steps of receiving, from the guest via one of the plurality of terminals, a guest identifier associated with the guest; identifying preference information associated with the guest based on the guest identifier; generating a message comprising the targeted content; determining whether the targeted content applies to the guest based on the preference information associated with the guest and the targeted content; and when it is determined that the targeted content applies to the guest, transmitting, via the network, the message to the guest at the one terminal.

Yet another embodiment consistent with the present invention includes a system for providing communication services for patrons at a hospitality facility. The system includes a first terminal configured to transmit contact information and a patron identifier associated with a patron at the first terminal; a server configured to receive the patron identifier and the contact information from the first terminal, authenticate the patron using the patron identifier, determine a location of a contact based on the contact information, and establish a communication link between the patron at the first terminal and the determined location of the contact, wherein the communication link is configured to transmit sound information;

and a network communicatively connected to the first terminal, the server, and the determined location of the contact.

BRIEF DESCRIPTION OF THE DRAWINGS

The accompanying drawings, which are incorporated in and constitute a part of the specification, illustrate presently preferred implementations of the invention. Together with the general description given above and the detailed description of the preferred embodiments given below, the drawings explain the principles of the invention.

FIGS. 6A-6J are graphical illustrations of exemplary menus displayed on client terminals consistent with the present invention.

FIG. 8 is a flow diagram depicting an exemplary process for providing audio/video information and VON services consistent with an embodiment of the present invention.

DETAILED DESCRIPTION

Figure 1:
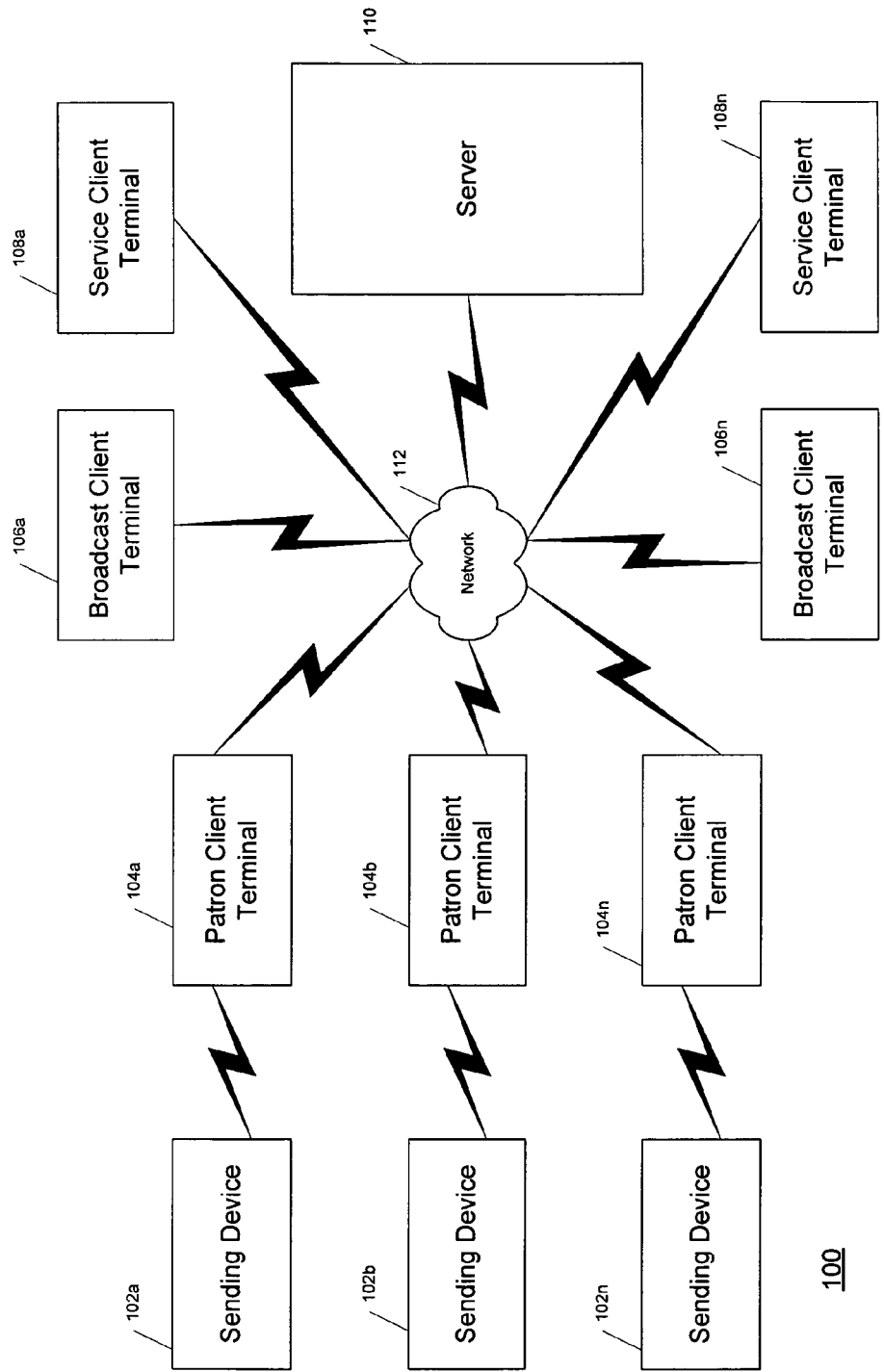
FIG. 1 is a block diagram of an exemplary hospitality facility system consistent with the present invention.

The following detailed description refers to the accompanying drawings. Although the description refers to exemplary embodiments, other embodiments are possible, and changes may be made to the embodiments described without departing from the spirit and scope of the invention. The following detailed description does not limit the invention. Instead, the scope of the invention is defined by the appended claims and their equivalents.

Systems, methods, and articles of manufacture consistent with the present invention allow a user, such as a patron or a person affiliated with a hospitality facility, to locate and/or communicate with another patron at a hospitality facility. For example, systems, methods, and articles of manufacture consistent with the present invention may assign to each patron a unique patron identifier (e.g., account number) and a sending device (such as a magnetic card or a transmitter). Moreover, each location in the hospitality facility (e.g., restaurant, hotel lobby, and hotel room) may include a unique location identifier and a receiving device (such as a card reader or a receiver). Whenever a patron enters or exits a location, the receiving device may receive, the patron identifier, from the patron's sending device. Then, the receiving device may send, for example, to a server, both the patron identifier and the location identifier for storage. As a result, systems, methods, and articles of manufacture consistent with the present invention may track each location visited by a patron at the hospitality facility. Furthermore, a user (such as a patron or a person affiliated with the hospitality facility) may locate or communicate with a particular patron using a client terminal or a similar device. After the user enters the name of a particular patron, the client terminal may retrieve the location (or last-known location) from a database on a server. The user may then send a message, initiate a voice over network (VON) call to the patron, or obtain the patron's current location or last-known location. For example, a patron may send a personal message, such as "Meet me in the lobby in five minutes," to another patron. Similarly, a person affiliated with the hospitality facility may inform a patron of the status of an event, such as the status of an offline game, or notify a patron of a promotion. The message may have any type, such as an instant message, an e-mail message, or a voice message. The location information may include information identifying the location, such as "Front Desk," and/or directions to that location.

Further, systems, methods, and articles of manufacture consistent with the present invention may provide access to content including, for example, sporting events, music, and venue sponsored entertainment.

Systems, methods, and articles of manufacture consistent with the present invention may also assist users in finding a lost patron, for example, by sending a message with a photograph of the lost patron to all client terminals in the hospitality facility. Such systems, methods, and articles of manufacture may also facilitate finding lost patrons simply by storing the last-known locations of these patrons.

The foregoing and the following examples are intended to be illustrative of the features of the present invention as opposed to limiting it in any manner. Moreover, systems, methods, and articles of manufacture consistent with the present invention are not limited to any particular hospitality facility, patron, or user. A hospitality facility may include, but is not limited to, hotels, motels, amusement parks, theme parks, casinos, and resorts. A patron may include, but is not limited to, a guest of the hospitality facility. A user may include, but is not limited to, a patron or a person affiliated with a hospitality facility, such as an employee.

FIG. 1 is a block diagram of an exemplary hospitality facility system 100 consistent with the present invention. System 100 may include sending devices 102a-102n, patron client terminals 104a-104n, broadcast client terminals 106a-106n, service client terminals 108a-108n, and a server 110, all interconnected by a network 112. In the following description, a single sending device, a single patron client terminal, a single broadcast client terminal, and a single service client terminal are referred to as a sending device 102, a patron client terminal 104, a broadcast client terminal 106, and a service client terminal 108, respectively. Moreover, patron client terminals 104a-104n, broadcast client terminals 106a-106and service client terminals 108a-108n are collectively referred to as client terminals.

Sending device 102 may be a magnetic card, a smart card, a credit card, a debit card, a radio frequency transmitter, an infrared frequency transmitter, a magnetic device, or a similar device that can store a patron identifier (e.g., account number). Each patron may have a unique patron identifier. A patron identifier may include letters, numbers, or a combination of both. For example, if the sending device is a credit card, the patron identifier may be the credit card number imprinted on the credit card. In one embodiment, sending device 102 may transmit a patron identifier to, for example, a receiving device of a patron client terminal 104 and/or a service client terminal 108. In another embodiment, sending device 102 comprises jewelry (such as a watch, a pin, a bracelet, a tie clip, or a belt buckle) with a transmitter or some other promotional item (such as a key fob) with a transmitter.

Patron client terminal 104 may be a computer or a similar device that may receive or retrieve patron identifiers, receive information requests from patrons, display information to patrons, and communicate with server 110. Using a patron client terminal 104, a patron at a hospitality facility may locate other patrons or communicate with other patrons at the hospitality facility. Patron client terminals 104a-104n are generally used by patrons of the hospitality facility and may be located throughout the hospitality facility.

In one embodiment, patron client terminals 104a-104n may include, for example, the player terminals and/or kiosk terminals disclosed in U.S. patent application Ser. No. 09/488,556 ("'556 application"), filed Jan. 21, 2000; the player terminals disclosed in U.S. Pat. No. 6,280,328 ("'328 patent"), and/or U.S. Pat. No. 5,674,128 ("'128 patent"); and/or the on-site or off-site client terminals disclosed in U.S. patent application Ser. No. 09/689,841, filed Oct. 13, 2000 ("'841 application"). The contents of all the aforesaid patents and applications are hereby incorporated by reference. Alternatively, patron client terminals 104a-104n may be combined with the player terminals, kiosk terminals, and/or the on-site or off-site client terminals disclosed in the aforesaid applications. In still another embodiment, patron client terminals 104a-104n may be used to accomplish tasks performed by the player terminals, kiosk terminals, and/or on-site or off-site client terminals disclosed in the aforesaid applications.

Each patron client terminal 104 may also have a unique location identifier, such as a letter, a number, or combinations of both. For example, if the patron client terminal 104 is a computer, the location identifier may be an Internet Protocol (IP) address.

In one embodiment, where sending device 102 is a transmitter, patron client terminal 104 receives a patron identifier from sending device 102 and sends this patron identifier along with the client terminal's location identifier through network 112 to server 110. In another embodiment, where the sending device 102 is a magnetic card, the patron client terminal 104 retrieves the patron identifier from sending device 102 and sends this patron identifier along with the client terminal's location identifier via network 112 to server 110.

As shown in FIG. 1, systems, methods, and articles of manufacture may include one or more broadcast client terminals 106a-106n in addition to the one or more patron client terminals 104a-104n. Broadcast client terminals 106a-106n generally receive messages from server 110 and display the received messages to users. The displayed messages may be promotions, advertisements, or missing patron notices that may include photographs of one or more missing patrons. Broadcast client terminal 106 may be a dummy terminal, a large display board, or any other device for receiving and displaying messages. Each broadcast client terminal 106 may also have a unique location identifier like the patron client terminal 104.

In one embodiment, broadcast client terminal 106 may include an input device and other components to allow a user to respond to a displayed message. For example, if the message is a missing patron notice, the broadcast client terminal 106 may allow a user to input information about the missing patron that may help locate the missing patron. In this embodiment, broadcast client terminal 106 may be a computer or any similar device for displaying information, receiving user input, and communicating with server 110.

As shown in FIG. 1, systems, methods, and articles of manufacture consistent with the present invention may also include one or more service client terminals 108a-108n. Service client terminal 108 may be a computer or a similar device. Service client terminal 108 may interact with server 110 to allow a user to locate or communicate with a patron. Each service client terminal 108 may also have a unique location identifier like the patron client terminal 104. Generally, service client terminals 108a-108n may be used only by personnel at the hospitality facility. For example, service client terminal 108 may be used by a person affiliated with a hospitality facility to send messages that include promotions, advertisements, or missing patron notices to all or a subset of patron client terminals 104a-104n and broadcast client terminals 106a-106n. Service client terminal 108 may also be used to receive messages from server 110 and display the received messages. In addition, service client terminal 108 may also be used to accomplish administrative and management tasks, such as opening accounts for patrons or generating various internal reports.

In one embodiment, service client terminals 108a-108n may include, for example, the service-client stations, customer service stations, the cashier stations, and/or the management and reporting stations disclosed in the '556 application; the cashier station and/or the customer service station disclosed in the '328 patent and the '128 patent; and the service client terminals disclosed in the '841 application. Alternatively, the service client terminals 108a-108n may be combined with a system that includes the service-client stations, customer service stations, the cashier stations, the management and reporting stations, and/or service client terminals disclosed in the aforesaid applications. In still another embodiment, the service client terminals 108a-108n may be used to accomplish the tasks performed by the service-client stations, customer service station, the cashier station, the management and reporting station, and/or the service client terminals disclosed in the aforesaid applications. For example, service client terminals 108a-108n may communicate with server 110 to transmit new software and software upgrades to patron client terminals 104a-104n and broadcast client terminals 106a-106n and to remotely reconfigure these client terminals.

As shown in FIG. 1, systems, methods, and articles of manufacture may also include server 110. Server 110 may maintain and control patron client terminals 104a-104n, broadcast client terminals 106a-106n, and service client terminals 108a-108n, and receive patron identifiers and location identifiers from the patron client terminals 104a-104n. In addition, server 110 may include a database for storing patron account files for each patron. Each patron account file may include the patron's identifier, the patron's identification information (e.g., name, address, and/or date of birth), the patron's preference information (e.g., preferred beverage, snack, language, restaurant, and/or golf course), the patron's location information (e.g., including the location identifiers corresponding to the locations visited by the patron while at the hospitality facility), and an address book. The address book may include information about other patrons and may be used by a patron to locate these other patrons and/or communicate with these other patrons at the hospitality facility.

The database of server 110 may also store client terminal files for each client terminal located in the hospitality facility. Each client terminal file may include the location identifier of the client terminal, the physical location of the client in the hospitality facility, and the identification information, such as a patron identifier, of the user(s) who have used the client terminal.

Server 110 may process location requests received from patron client terminals 104a-104n and transmit messages (e.g., in the form of text, graphics, video, audio) and other data to patron client terminals 104a-104n, broadcast client terminals 106a-106n, and service client terminals 108a-108n for display or further processing. Server 110 may be located in a secured area of the hospitality facility, accessible by authorized personnel only. In the embodiment of FIG. 1, only one server 110 is shown. As the size of network 112 grows, however, additional servers may be added.

In one embodiment, server 110 may be the amenities server disclosed in the '556 application. Alternatively, server 110 may be combined with a system that includes the amenities server and/or transaction processor subsystem disclosed in the '556 application; the central control network, the games server, and/or the terminal server disclosed in the '328 patent and/or the '128 patent; and/or server 108 disclosed in the '841 application. In still another embodiment, server 110 may be used to accomplish tasks performed by the amenities server and/or transaction processor subsystem disclosed in the '556 application; the central control network, the games server, and/or the terminal server disclosed in the '328 patent and/or the '128 patent; and/or server 108 disclosed in the '841 application. For example, server 110 may assist a patron in purchasing wagers, which may be revealed from an off-site location.

Network 112 may be a single or a combination of any type of computer network, such as a Local Area Network (LAN) or a Wide Area Network (WAN). For example, network 112 may comprise an Ethernet network according to the IEEE 802.3 standard, a wireless network according to the IEEE 802.11x standard, or any other network consistent with embodiments of the present invention.

While the components of FIG. 1 are shown as logical devices, one skilled in the art would readily understand that each can be associated with a respective physical device. For example, as described in the foregoing description, server 110 may be a computer. In addition, it will be apparent to one skilled in the art that as the size of the network grows and the number of transactions increase, additional servers may be added. Also, it will be known to those skilled in the art that server 110 and the client terminals may use a single or a combination of protocols and technologies to communicate with each other. For example, server 110 and client terminals may use Hypertext Transfer Protocol (HTTP) and Transmission Control Protocol/Internet Protocol (TCP/IP) for transport and Hypertext Markup Language (HTML) for presenting information to users.

Furthermore, other system and network configurations will be known to those skilled in the art. For example, in an alternative embodiment, instead of having separate broadcast client terminals 106a-106n and/or separate service client terminals 108a-108n, one or more of the patron client terminals 104a-104c may be used as broadcast client terminals and/or service client terminals.

One skilled in the art would appreciate that systems, methods, and articles of manufacture consistent with the present invention may also be implemented either singly or in combination with the inventions disclosed in the '556 application, '328 patent, '128 patent, and/or the '841 application.

In accordance with one embodiment of the present invention, a patron wishing to use hospitality system 100 may establish a patron account for storage in server 110 and receive a sending device (e.g., magnetic card). This account may be established, for example, at a service client terminal 108, which may be located at the front desk of a hotel. In one embodiment, the service client terminal 108 may be operated by an employee of the hospitality facility. In another embodiment, the service client terminal 108 may be unmanned, obtaining information from a patron through a series of interactive menus. To establish an account, the patron may need to provide some identifier information (e.g., name, address, and/or date of birth) and preference information (e.g., preferred beverage, snack, language, restaurant, and/or golf course). Once the patron provides the requested information, the information is sent to the server 110, which in turn establishes a patron account file for the patron and issues the patron a unique patron identifier. In addition, during account establishment, the patron may be asked to select a personal identification number ("PIN") via a data entry device (e.g., icons on a touch-screen display). The patron identifier may be stored on a sending device 102, such as a magnetic card. In another embodiment, in addition to storing the patron identifier, an encrypted version of the PIN may also be stored on a sending device 102.

In still another embodiment, the patron's identifier information and preference information could be sent to the system 100 before the patron arrives at the hospitality facility, for example, via the Internet, so that the patron's sending device would be ready when the patron arrived at the hospitality facility.

For some types of sending devices 102a-102n, a number pre-assigned to the sending device may be used as the unique patron identifier and thus, server 110 need not generate a patron identifier. For example, if the sending device is a credit card or a debit card, the account number on the credit card or debit card may be used as the patron identifier.

Figure 2:
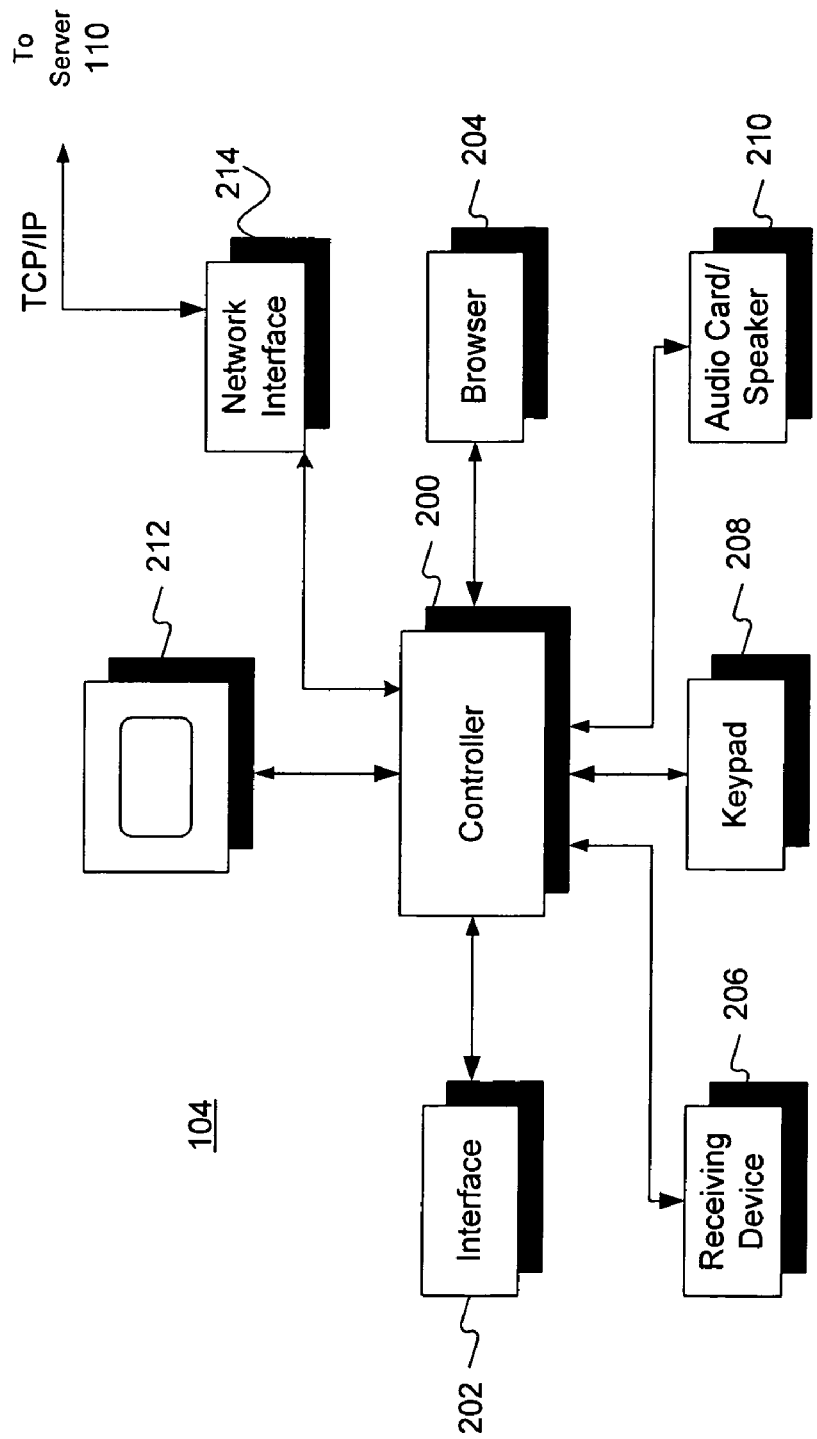
FIG. 2 is a block diagram of an exemplary patron client terminal consistent with the present invention.

FIG. 2 is a block diagram of an exemplary patron client terminal consistent with the present invention. As shown, a patron client terminal 104 may include a controller 200, an interface 202, a browser 204, a receiving device 206, a data entry device (not shown), an audio card/speaker module 210, a video display with touch-screen capability 212, and a network interface 214.

Controller 200 may include a processor and/or memory. Interface 202 may include a software application for displaying attract mode graphics to attract a patron to patron client terminal 104.

Browser 204 may include a conventional software application, such as NETSCAPE NAVIGATOR or INTERNET EXPLORER, for issuing HTTP requests to the server 110. For example, browser 204 may request a specific web page or ask the server 110 to perform a database query. Browser 204 may also read HTML codes embedded in the web pages received from the server 110 to determine how, where, and in what colors and fonts the elements on the web pages may be displayed.

Receiving device 206 may include a magnetic card reader, a smart card reader, a radio frequency receiver, an infrared frequency receiver, a magnetic device detector, or any similar device known to those skilled in the art that retrieves or receives patron identifier information. The type of sending device 102 may dictate the type of receiving device 206.

A data entry device may comprise a conventional alphanumeric or numeric entry device. A data entry device may, for example, permit a patron to enter a PIN to verify the identity of the patron at the patron client terminal 104. A data entry device may not be necessary since patron may be able to input the PIN using the touch-screen on video display 212.

Audio card/speaker module 210 may comprise a conventional audio card, amplifier, and speaker for presenting audio. Video display 212 may comprise a conventional touch-screen video monitor for displaying video graphics and receiving patron inputs, such as a PIN. A touch-screen may not be necessary, however, since patron inputs can be made through a data entry device.

Network interface 214 transmits the requests from, for example, browser 204 to server 110. The requests may be broken into HTTP packets that are sent across a TCP/IP network 112 to the server 110. Network interface 214 may also receive incoming messages addressed to patron client terminal 104. In addition, network interface 214 may check for errors in transmission using, for example, cyclical redundancy check ("CRC").

Although not shown, patron client terminal 104 may include a printer device to print information received from the server 110 or other information. Moreover, patron client terminal 104 may also include other input devices, such as a pointing device (e.g., trackball or mouse) and a data entry device. In addition, patron client terminal 104 may also include head phones, for example, to listen to messages, and text-to-speech and/or speech-to-text conversion software, respectively, to listen to received messages and/or to send messages.

Furthermore, although not shown, the service client terminal 108 and the broadcast client terminal 106 may also include all or some of the components that are included in a patron client terminal 104. In one embodiment, service client terminal 108 may also include a device that can write to the sending device. For example, if the sending device is a magnetic card, service client terminal 108 may include a magnetic card issuance system like the one disclosed in the '556 patent application. Service client terminal 108 may also include a scanning device for scanning and storing a patron's signature or photograph or scanning a patron's drivers license. In another embodiment, service client terminal 108 may include recognition software to detect the patron's identifier information, such as name, address, and/or date of birth, from the patron's drivers license.

Figure 3:
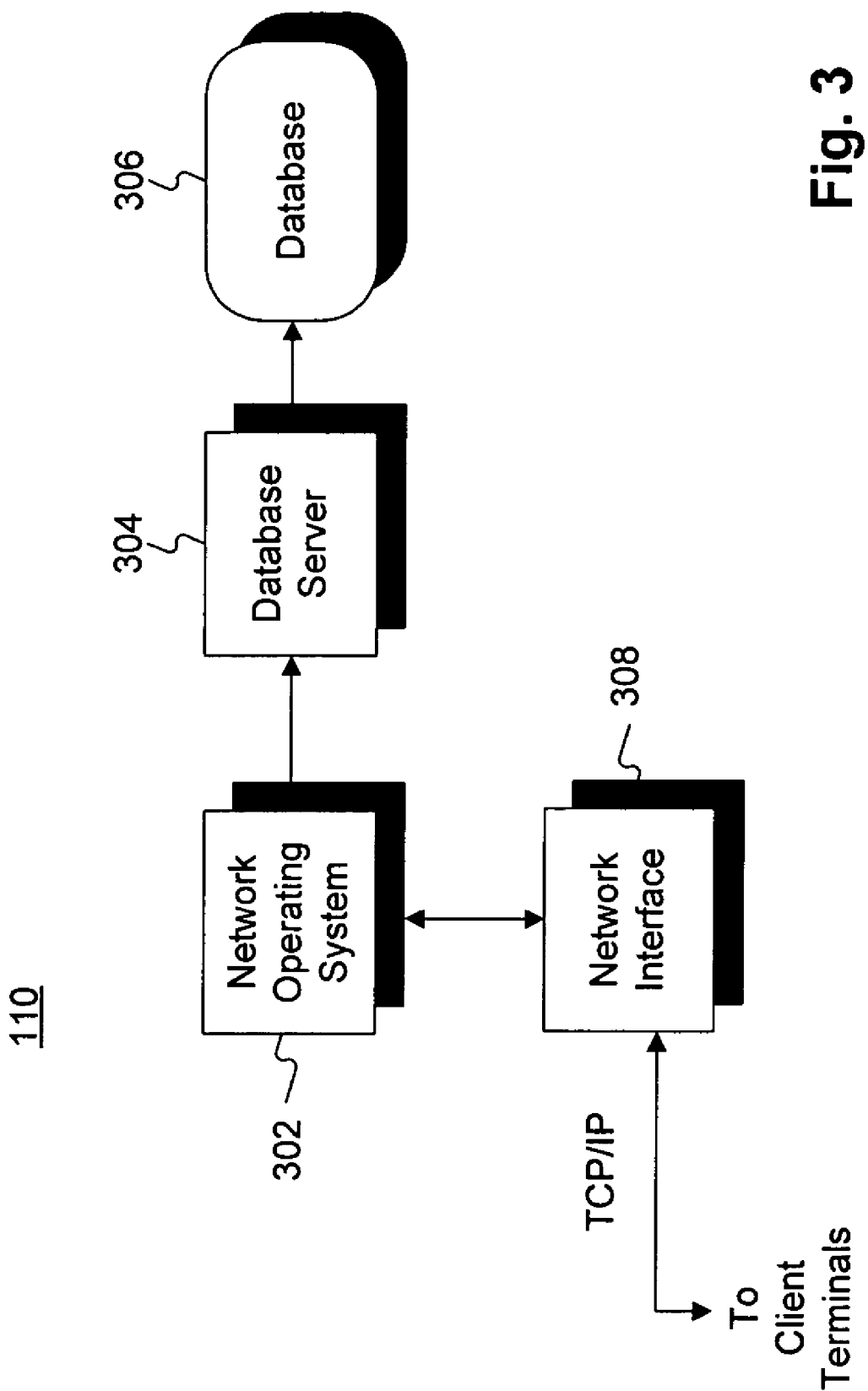
FIG. 3 is a block diagram of an exemplary server consistent with the present invention.

FIG. 3 is a block diagram of an exemplary server 110 consistent with the present invention. As shown, server 110 may include network operating system 302, a database server 304, a database 306, and a network interface 308. Network operating system 302 may include a conventional network operating system, such as WINDOWS NT SERVER or UNIX. Network operating system 302 may process requests from client terminals, monitor network hardware and software, coordinate communication in the network, and provide transaction security.

Database server 304 may build and maintain database 306. In addition, database server 304 may retrieve from database 306 patron account information, client terminal information, graphical menus, and other multimedia information responding to requests from the client terminals. Furthermore, the database server 304 may be a SQL Server or similar database management system (e.g., Oracle, MySQL, etc.).

Database 306 may store patron account files, client terminal files, graphical menus, an internal mapping of the hospitality facility, and other multimedia information. In one embodiment, the internal mapping may be used to derive a map for giving a user directions to the location of a patron. In another embodiment, database 306 may be a relational database.

Similar to network interface 214, which was described above in connection with FIG. 2, network interface 308 may transmit information to and receive information from the client terminals. In addition, network interface 308 may check for errors in transmission using, for example, cyclic redundancy check (CRC).

In accordance with one embodiment of the present invention, each location in a hospitality facility (e.g., restaurant, hotel lobby, and hotel room) may include at least one client terminal. To track each patron's movement throughout the hospitality facility, for example, the hospitality facility may require each patron to log onto a client terminal whenever a patron enters a location and/or log off from the client terminal whenever the patron exits the location. Alternatively, the logon and logoff may be automatic, as in the case where the sending device is a transmitter carried or worn by the patron.

Whenever a patron logs on or logs off a client terminal, the receiving device 206 of the client terminal may send the patron identifier, the location identifier, the event (e.g., logon or logoff), and date and/time of the logon or logoff to server 110, which in turn updates database 306. In this embodiment, server 110 may update the patron's account file in database 306 with information, such as date and time of entry and/or exit, and location identifier. In another embodiment, however, server 110 may also update the client terminal file with information, such as date and time of entry and/or exit, and patron identifier. Consequently, when a user is trying to locate a patron server 110 may do so either by searching the patron's account file for the location identifier or by searching the client terminal files for the patron identifier of that patron. These and other methods of storing and querying a database are known to those skilled in the art and are also within the scope of the present invention. Moreover, it will be apparent to one skilled in the art that database 306 may either contain a list of all locations or a set number of locations, such as the last five locations, that the patron has visited.

Depending on the sending device and receiving device, the patron may need to take an action to log on or log off the client terminal. For example, if the sending device is an infrared or radio frequency transmitter, the patron may not need to take any action as long as the transmitter can communicate with a receiver. As a result, a patron may move from one location to another in a hospitality facility and the location information may be updated automatically. On the other hand, if the sending device is a magnetic card, the patron may need to insert the card into a receiving device 206, such as a card reader, to log onto the client terminal. In one embodiment, the client terminal may ask the patron whether the patron is entering or leaving the particular location.

In another embodiment, if the patron selected a PIN during account establishment, the patron may need to enter the PIN to log on the client terminal. In still another embodiment, if the patron selected a PIN during account establishment, the patron may be required to enter a PIN depending on the type of client terminal used by the patron. For example, the patron might not be required to enter a PIN at a client terminal in the entry/exit of a restaurant. On the other hand, if the client terminal is player terminal like the one described in the '556 application and the patron is using the player terminal to gamble, the patron may be required to enter the PIN. These and other embodiments will be apparent to those skilled in the art from the foregoing and following description, and thus, are also within the scope of the present invention.

In accordance with one embodiment of the present invention, to locate or communicate with other patrons, the hospitality facility may require that patrons create an address book containing the identity of other patrons, such as family and friends. The hospitality facility may further require that the other patrons agree to being included in the patron's address book. The address book may be created during account establishment or after account establishment. In an alternative embodiment, a blank address book may be automatically created for each patron during account establishment and the patron may add patrons to this address book during or after account establishment.

Figure 4:
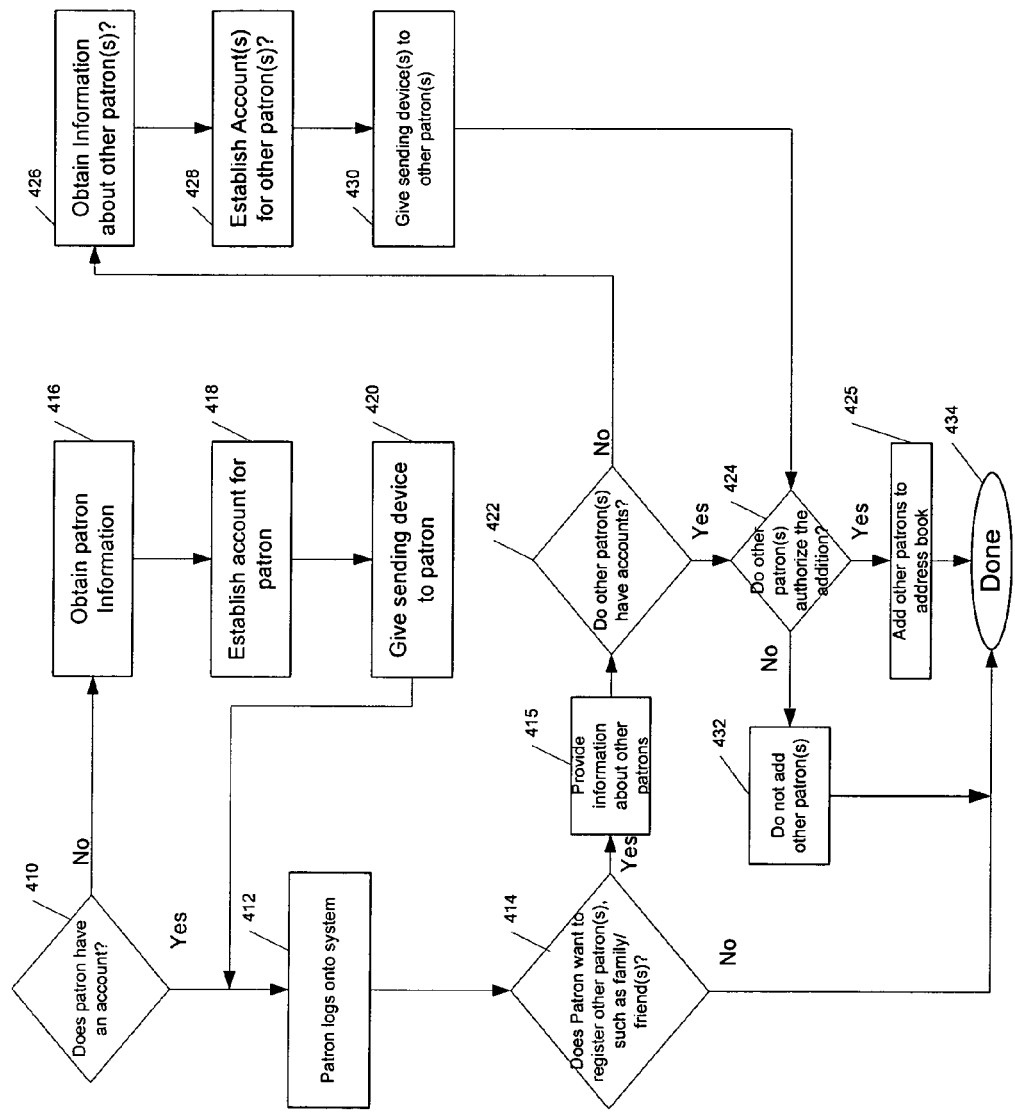
FIGS. 4 and 5 are flow diagrams of an exemplary method of operating a system consistent with the present invention.

Referring to FIG. 4, the process of establishing an account and adding patrons to the address book will be described now in detail. If the patron already has an account, then the patron may log onto system 100 (steps 410 and 412). On the other hand, if a patron does not have an account, the patron may need to establish an account (step 410). As described in the foregoing description, to establish an account, the patron may need to provide some identifier information (e.g., name, address, and/or date of birth) and preference information (e.g., preferred beverage, snack, language, restaurant, and/or golf course) (step 416). The patron's photograph may be taken and stored in database 306 for identification and for finding the patron in case he or she gets lost (step 416). The patron may also be asked to select a PIN (step 416).

In addition, the patron may also be asked to select other users, including other patrons and hospitality facility personnel, so that these users can add the patron to their address book and/or can access the patron's information. In this embodiment, the users may not be able to add the patron to their address book and/or access patron information unless the patron gives permission to the users (step 416). In an alternative embodiment, all users may have access to the patron information and/or may add the patron to their address book unless the patron restricts permission. (step 416). In still another embodiment, the patron may not be able to restrict hospitality personnel from accessing his or her information, or from adding the patron to their address books.

Once the patron provides all the requested information, service client terminal 108 may send the information to server 110, which in turn may establish a patron account file for the patron in database 306 and issue a unique patron identifier to the patron (step 418). The patron identifier (and the PIN, if required) may then be stored on sending device 102. For example, if the sending device is a magnetic card, the patron identifier (and if required, an encrypted version of the PIN) may be stored on the card. In another embodiment, as described in the foregoing description, an identifier already associated with a sending device 102 may be used as the patron identifier as long as it uniquely identifies a patron. In this case, the identifier associated with the sending device 102 may be entered and stored in the patron's account file.

Next, sending device 102 may be given to the patron (step 420). Once the patron receives the sending device, the patron may log onto system 100 (step 412). In another embodiment, since the patron just established an account, the patron may not need to log onto system 100.

Once the patron logs onto system 100 at a service client terminal 108 or patron client terminal 104 (step 412), server 110 may send a selection menu to the client terminal. The menu may include an option asking the patron whether the patron wants to add other patrons, such as friends and/or family, to his or her address book (step 414). If the patron does not want to add other patrons, then, the patron is done (step 434). On the other hand, if the patron does want to add other patrons, the patron may need to provide information, such as patron identifiers or names of other patrons (step 415).

Next, server 110 determines whether these other patrons have accounts, for example, by querying database 306 (step 422). If so, server 110 determines whether these other patrons have agreed to be included in the patron's address book (step 424). In an alternative embodiment, the process of adding patrons to an address book is administered by an agent (such as an employee) at service client terminal 108 so that the agent can verify that the patrons to be added to the address book give permission to be found by the patron. If server 110 determines that the user does have permission to add the selected patron, then the server 110 adds the selected patron to the user's address book and the patron is done (steps 424, 425, and 434). On the other hand, if server 110 determines that the patron does not have permission to add other patrons (step 424), then server 110 does not add the other patrons to the patron's address book and the patron is done (steps 432 and 434).

If it is determined that some or all of the other patrons do not have accounts (step 422), these patrons may be asked to establish accounts (steps 426, 428, and 430). Steps 426, 428, and 430 are similar to steps 416, 418, and 420, and thus, will not be described in further detail. Once the other patrons have accounts, server 110 determines whether these patrons have agreed to be included in the requesting patron's address book (step 424). If so, then, server 110 adds the other patrons to the requesting patron's address book (step 425). On the other hand, if server 110 determines that the patron does not have permission to add other patrons (step 424), then server 110 does not add the other patrons to the patron's address book and the patron is done (steps 432 and 434). The process of adding other patrons is now complete (step 434).

Patrons may use a data entry device (e.g., the touch-screen capabilities of video display 212) to establish an account and to add other patrons to their address book. Moreover, while the process was described with reference to patrons, other users, such as hospitality facility personnel, may similarly establish address books and add particular patrons to their address books.

Although the process of adding patrons to an address book is shown in FIG. 4 as being separate from the process of establishing an account, those of ordinary skill in the art would appreciate that these processes may be combined. Moreover, the address lists may be pre-established before the patron arrives at the hospitality facility. For example, the patron and his/her family and friends may submit requests to include one another on their respective address books. In yet another embodiment, the system 100 may automatically place travel companion's on one another's address book provided the system is informed that the patrons are in fact travel companions.

Moreover, although not shown in FIG. 4, after adding other patrons to a patron's address book (step 425), the patron may be given the option of creating groups in the address book. Each group may include other patrons who were added by the patron to his or her address book. In addition, it will be apparent to one skilled in the art that a patron may be given the option of creating a group at a later time, for example, during a subsequent logon onto a client terminal.

The process of locating or communicating with patrons will be described by referring to FIG. 5 and FIGS. 6A-6J. It is assumed that the user has already followed the steps in FIG. 4 to establish an account and has added the other patrons to his or her address book. Furthermore, it is assumed that if the user is a patron, the user may be using patron client terminal 104 and if the user is a person affiliated with the hospitality facility, then the user may be using service client terminal 108 to locate and/or communicate with other patrons. It is also assumed that the user has logged on at the client terminal and that the patron identifier corresponding to the user has been sent to the server.

Using a client terminal, the user may select the "Locate/Send Message" option from an exemplary menu 602, as shown in FIG. 6A (step 510). The client terminal may request the user's address book from the server 110. Next, the client terminal may display the user's address book (step 512), such as address book 604 shown in FIG. 6B. The user may then select the patron to be located or to whom a message should be sent (step 514). This selection is sent to the server 110, which in turn determines whether the selected patron are online (step 516). A patron is online if the patron is logged on a client terminal. A variety of methods could be used to determine whether a patron is online. For example, server 110 could compare the patron identifier corresponding to the selected patron to the patron identifiers received from client terminals. Alternatively, a flag may be set in database 306 whenever a patron logs on a client terminal. Server 110 could look up the flag in database 306 to determine whether the selected patron is logged on at a terminal.

Figure 6D:
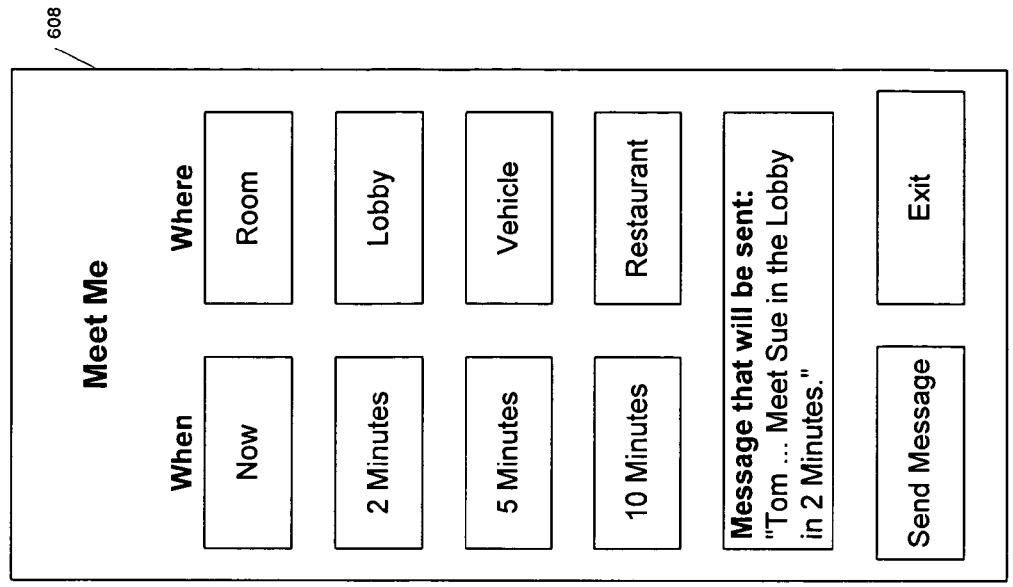
Figure 6C:
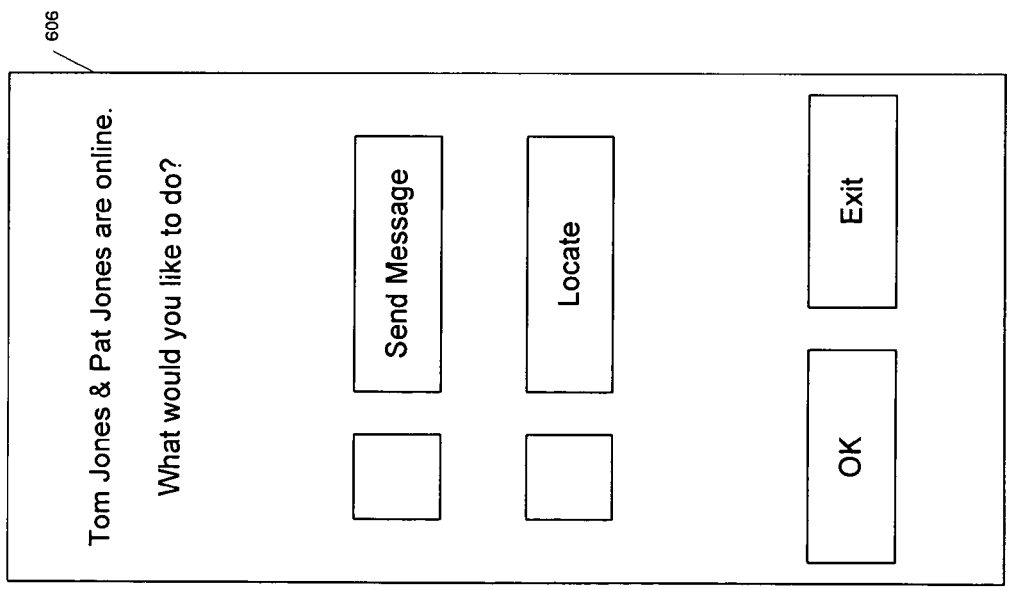

If all or some of the selected patrons are online, the user may be asked to select between sending a message and locating the patron (step 522), for example, by displaying several options 606, as shown in FIG. 6C. In an alternative embodiment, the user may be able to choose both options.

If the user chooses locate, then, the server 110 may retrieve the location information (including the location identifier) for the selected patrons from the database 306 (step 524). As described in the foregoing description, server 110 may retrieve location information for a patron either by searching the patron's account file for the location identifier or by searching the client terminal files for the patron identifier of the patron that the user is trying to locate.

Next, the server 110 may send the retrieved location information to the client terminal, which in turn may display the location information for the selected patrons (step 526). In one embodiment, the user may be asked to choose a format for the location information. For example, the user may be given the option of choosing between the name of the location (e.g., "ABC Restaurant"), textual directions, and graphical directions (e.g., a map). If the user chooses textual directions, the server 110 may send textual directions based on the location identifier of the user, the location identifier of the selected patron, and/or the internal mapping of the hospitality facility. For example, the textual directions may be that the selected patron is "located 200 hundred feet away from the user and that the user should exit his/her present location, turn right, turn left at the next hallway, and find the patron 10 feet to the right of the front desk." On the other hand, if the user chooses graphical directions, the server 110 may derive a map based on the location identifier of the user, the location identifier of the selected patron, and/or the internal mapping of the hospitality facility that is stored in database 306.

Conversely, if the user selects the send message option (step 522), the user may be prompted to enter a message (step 534). In one embodiment, the server may display various message options 608 and ask the user to select one of them, as shown in FIG. 6D. In another embodiment, the user may use a data entry device to enter a customized message. Once the user enters the message, the client terminal sends the message to server 110. The server 110 then retrieves the location information for the selected patron and sends the message to the patrons based on this location information (steps 536 and 538). For example, if the selected patron is using a client terminal, server 110 may retrieve the location identifier for that client terminal and send the message to the client terminal using the location identifier. Although not shown, in one embodiment, an acknowledgment message may be displayed to the user indicating, for example, whether the message was successfully delivered. An exemplary acknowledgment message 610 is shown in FIG. 6E. An acknowledgment message may also indicate to the user whether the selected patrons has opened or read the message.

The message sent by the user can take an infinite number of different forms. For example, where the user is a patron, the message is typically a personal message, such as "Meet me in the lobby in five minutes." In addition, the message is typically sent to patron client terminals 104a-104n. On the other hand, if the user is a person affiliated with the hospitality facility, the message may be a status, a promotional, or a notification message. The status message may notify a selected patron of the status of an offline game (e.g., keno or bingo or a horse race). For example, the status message may notify the patron of a win, a loss, or the progress of the game. A promotional message may be a message about a promotion that is being offered by the hospitality facility. For example, a promotional message may include a dinner special or the chance to enroll in a lottery. A notification message may be a message notifying a patron of an event, for example, that a boxing match is scheduled to begin in fifteen minutes or that the patron's table is ready at a restaurant. It will be apparent to one skilled in the art that the messages are not limited to a status, a promotional, or a notification message. Moreover, a message may be based on preference, location, or gaming information stored in the patron's account. For example, if a patron likes baseball, the message may be a live data stream message that scrolls across the bottom of the video display of the patron's client terminal and that informs the patron of the baseball scores of a game in progress. In another example, depending on a patron's location, the message may offer one-half price sandwiches at a restaurant located nearby.

As discussed above, the messages may comprise status messages. An example will illustrate the use of status messages in casinos. In one embodiment, a patron may proxy play an offline game (such as bingo, keno, or a sporting event) and, at the same time, play on a player terminal. When some predetermined event concerning the offline game occurs (e.g., the game starts, the patron is within two plays of winning, the patron has won the game, or the game is over), server 110 may automatically locate the patron at a player terminal and send a status message. In one embodiment, the player can preselect the predetermined event about which he or she would like to receive a status message.

Also, as discussed above, the messages may comprise promotional messages. Another example will illustrate the use of promotional messages in a casino. Whenever a patron logs onto a client terminal in a casino, the patron may be prompted to enter his or her "lucky number." Later, the casino will send a message to all client terminals, offering a promotional draw to all patrons currently logged on to a client terminal. If a patron's lucky number matches (or even partially matches) the number drawn, the patron may win a prize.

If the server 110 determines that one or more of the selected patrons is not online (step 516), the server may ask whether the user wants to view the last-known location information or whether the user still wants to send a message (step 518), as shown by exemplary message 612 in FIG. 6F. If the user wants to send a message, the user may enter a message, which may be sent to the selected patron by the server 110 at a later time (steps 530 and 531). Again, the message may be a personal, status, promotional, or notification message. Generally, the message is stored in server 110, for example, in the selected patron's patron account file, and may be sent to the selected patron whenever the selected patron logs on a client terminal (step 531). In another embodiment, the user may be given the option of sending a message instructing the selected patron to contact the user whenever the selected patron is located. In this embodiment, the user may also select a time period (e.g., 8 hours) for delivery of the message, for example, as shown by options 614 in FIG. 6G. If server 110 is not able to locate the selected patron in the selected time period, server 110 will not deliver the message to the selected patron.

Moreover, although not shown, in one embodiment, an acknowledgment message may be displayed to the user indicating, for example, that the message was sent. An exemplary acknowledgment message 616 is shown in FIG. 6H.

Alternatively, if the user selects the option of displaying location corresponding to last-known location information (step 518), the server 110 may retrieve the last-known location information from the database 306 (step 528) and display it to the user (step 540) via the client terminal. This information may be displayed in any of the above-described formats (e.g., textual or graphical).

The server 110 may then ask the user, via the client terminal, whether the user wants to send a message to other patrons who may be using client terminals near the last-known location of the selected patrons (step 542). The message that is sent in this step is generally a missing patron message similar to message 618 that is shown in FIG. 6I. The missing patron message may be a message that includes information about the selected patron that may assist in locating that patron. For example, the missing patron message may include the missing patron's photograph, name, and/or description, which may be retrieved from the database 306. In one embodiment, only a person affiliated with the hospitality facility may send a message to patron located near the selected patron's last-known location.

Figure 5:
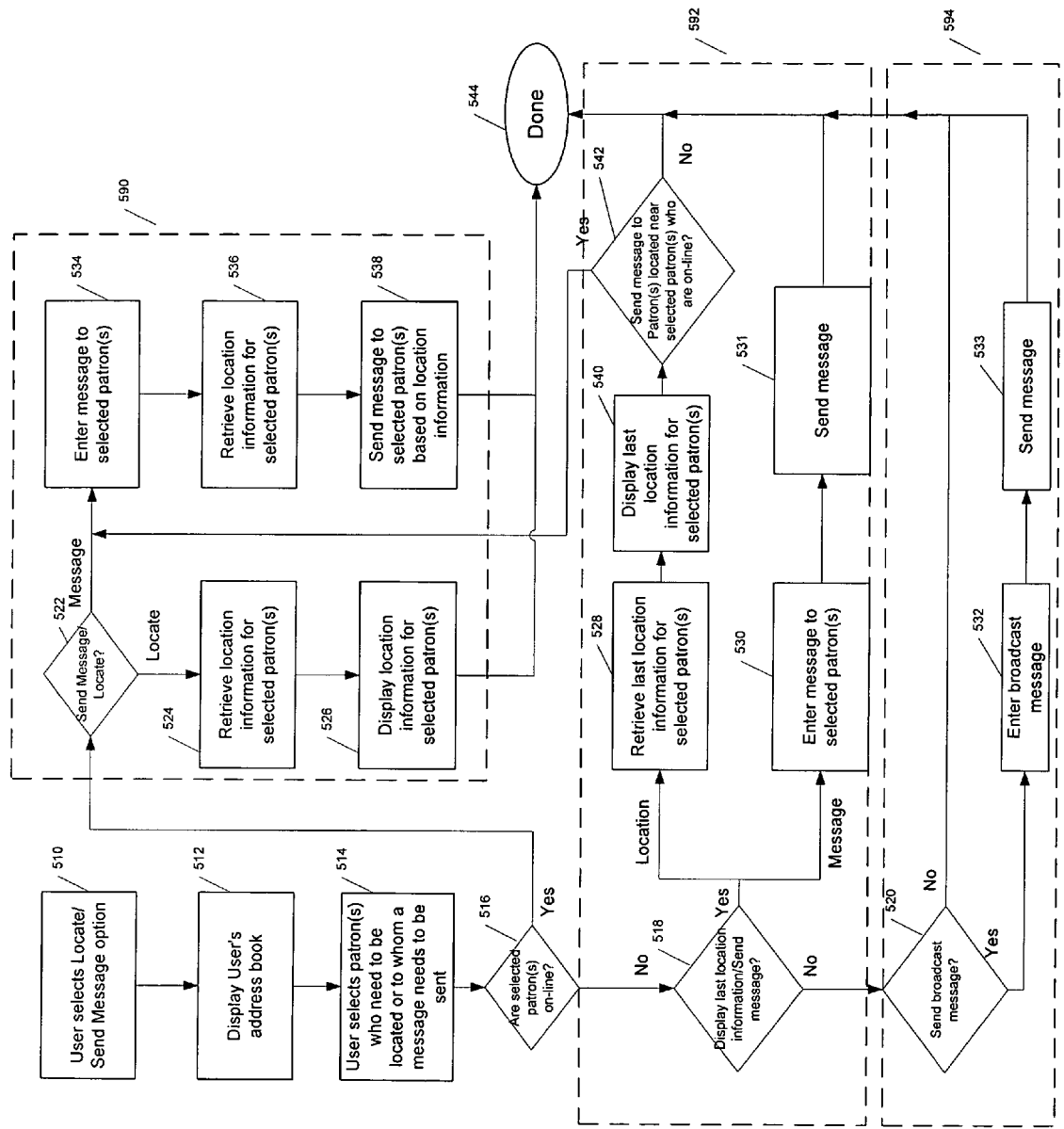

Although not shown in FIG. 5, if the user does want to send a message to patrons located near the last-known location of the selected patron, the server may send the names of patrons that are currently near the last-known location of the selected patron to the client terminal so that it can display the names to the user. The user may also be given the option of selecting some or all of the displayed patrons. Next, the user may enter the message and send the message to the desired patrons (steps 534, 536, and, 538).

In another embodiment, if the user chooses not to display last-known location information or does not want to send a message to the selected patron (step 518), the user may be given the option to send a broadcast message (step 520). A broadcast message is a message that is generally sent to all the patron client terminals 104a-104n, all service client terminals 108a-108n, and all broadcast client terminals 106a-106n in the hospitality facility. In other words, the server 110 ignores the selection made by the user (step 514) and instead sends the broadcast message to all client terminals. In another embodiment, however, the broadcast message may be sent to a subset of selected client terminals. For example, the server 110 may send the message to the client terminals corresponding to the selected patrons only (step 514). Moreover, in one embodiment, the broadcast message may be sent only by hospitality facility personnel. The broadcast message may be a status, promotional, notification, or a missing patron message.

If the user does not want to send a broadcast message, the process is complete (step 544). If, however, the user does want to send a broadcast message, the user may enter the broadcast message (step 532), the server 110 receives the message, and then, the server 110 sends the message (step 533).

In FIG. 5, the message may be in the form of text, graphics, video, and audio. Moreover, the message may be an instant message or an e-mail message. In addition, the message may be sent using known techniques, such as Common Gateway Interface (CGI) or servlets. The message may also be personally delivered to the patron by the hospitality facility personnel. For example, if the server 110 determines that the location identifier for a particular patron corresponds to a restaurant in the hospitality facility, the server 110 could send the message to a service client terminal 108 that is located in a restaurant. The waiter could then hand-deliver the message to the patron at his/her table. Similarly, personnel at the golf course could hand-deliver a message to a patron on the golf course after the patron finishes his/her last hole.

Furthermore, it will be apparent to one skilled in the art that the although the message in FIG. 5 is being sent from a user to selected patron, the selected patron may also send a reply message to the user. Moreover, the selected patron may also receive a message alert notifying the selected patron that a message has been received from a user. The message alert may be an audible alert and/or a dialog box with a message, such as "You have received a message from John Smith."

In addition, the process in FIG. 5 may be broken down into several different processes, for example, as shown by the dotted rectangles 590, 592, and 594 in FIG. 5. The dotted rectangles shown in FIG. 5 may represent three processes: locate and/or send a message to online patrons (590); display last location information and/or send message (592); or send broadcast message (594). These three processes may appear as three options in a menu 620, as shown in FIG. 6J. Moreover, it will be apparent to one skilled in the art that a hospitality facility may choose to only use and implement one of these processes. For example, a hospitality facility, such as a casino, may not want to implement the process of sending a message to patron located near the selected patron's last-known location (steps 542, 536, and 538) whereas a hospitality facility, such as a resort, may want to implement such a process.

It will be apparent to those skilled in the art that various modifications and variations can be made in the system and method of the present invention and in construction of this invention without departing from the scope or spirit of the invention. For example, biometric authentication may also be used with the systems, methods, and articles of manufacture consistent with the present invention. If biometric authentication is used, a patron's physical characteristics, such as fingerprint patterns, voice, eyes, face, and hand, etc., may be used as sending device 102 and a biometric device, such as a fingerprint scanner, may be used as the receiving device 206.

Wireless devices may also be used as sending devices and/or client terminals. For example, a pager could be used as a sending device and a client terminal to receive messages from users. Similarly, cellular phones could be used both, as sending devices, and client terminals to send and receive messages.

Voice over Network and Content Services

In addition to messaging services, hospitality system 100 may allow audio and video information to be shared between individuals including, for example, guests logged in at client terminals 104a-104n and non-guests inside or outside the hospitality facility with access to a telephone. For example, a guest playing at a client terminal located on the second floor of a hospitality facility may wish to talk with a friend playing at a client terminal on the first floor of the hospitality facility. Hospitality system 100 may enable the guest to locate her friend within the system and establish a direct communication link, similar to a phone call, thereby allowing conversation without the need to leave the client terminal. Alternatively, a guest may wish to call his wife at home to discuss his winning day at the client terminals while remaining at the client terminal or his wife may wish to call him without pulling him away from the client terminal. Using systems consistent with the present invention, the guest may make and receive telephone calls directly at a client terminal.

Audio and video information may also be shared by administrators or systems within the hospitality facility and guests logged in at client terminals 104a-104n (e.g., an "all aboard" message announcing the departure of a tour bus or beginning of an entertainment program).

Such services may be made available using voice over network (VON), such as using a voice over internet protocol (VoIP). VON allows users to communicate similarly to a telephone call, but over a data network like the Internet or an internal local area network (LAN) such as interactive services network 100. VON systems convert a voice signal from a microphone or a telephone into a digital signal that travels over a network and is converted back to a voice signal at the destination and reproduced by a speaker, telephone, or other device capable of reproducing a voice signal. This allows users with access to VON hardware to communicate with other users with access to a telephone, cell phone, VON hardware, or other similar device.

Figure 7:
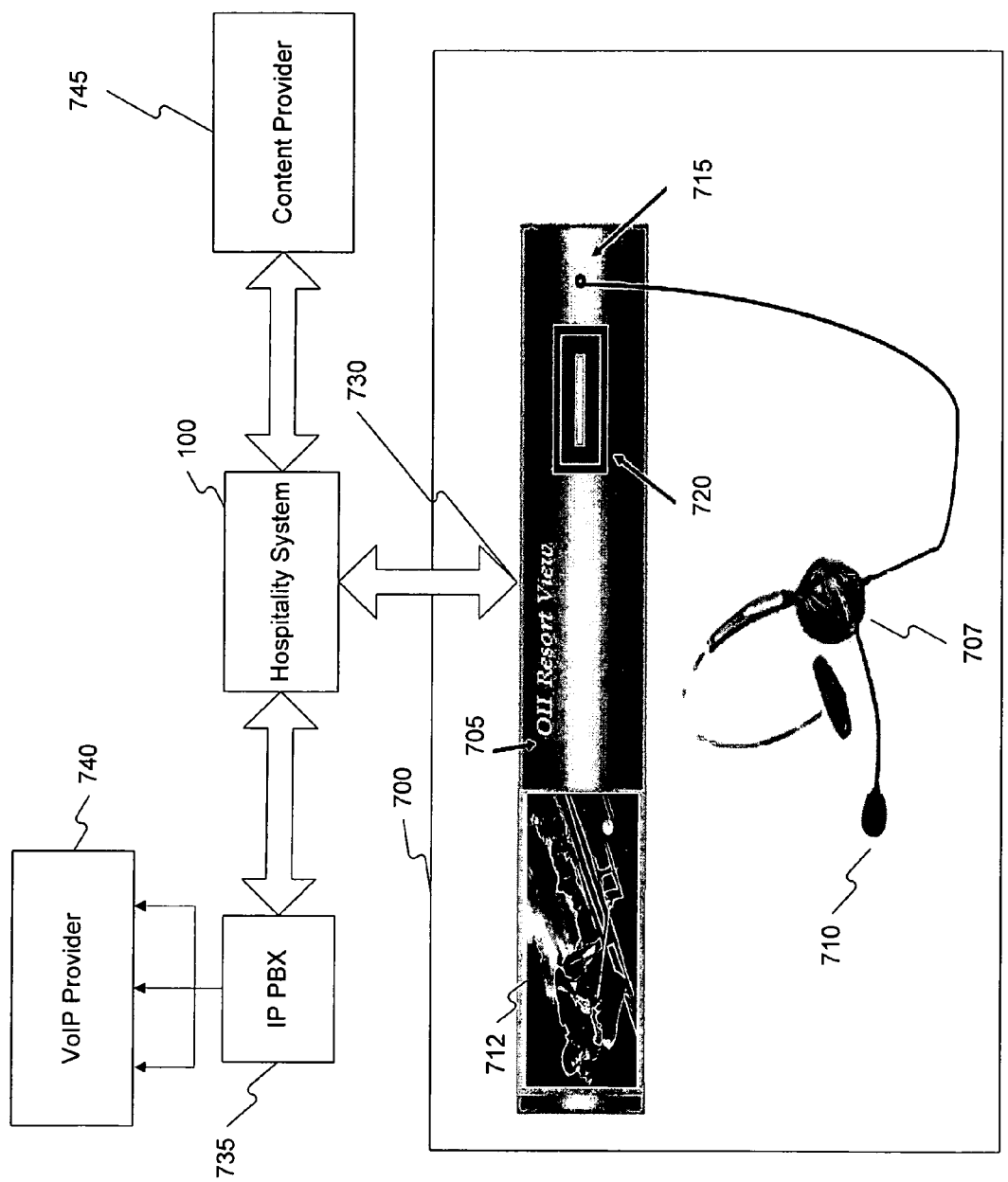
FIG. 7 is an exemplary depiction of VON hardware consistent with an embodiment of the present invention.

FIG. 7 is an exemplary depiction of VON hardware consistent with an embodiment of the present invention. VON client hardware 700 may include, for example, a VON interface 705, a headset 707, a microphone 710, an I/O interface 715, a magnetic card reader 720, a video display 712, and a network interface 730. VON client hardware 700 may also include a data entry device similar to a touch-screen or similar interface, a sound card (not shown), an analog to digital converter (not shown), and a digital to analog converter (not shown). VON client hardware 700 may include more or fewer components than are shown, for example, magnetic card reader 720 may not be present in VON interface 705 and receiving device 206 in client terminal 104 may be linked to VON interface 705 for providing user identification information. Alternatively, magnetic card reader 720 may be replaced by a data entry device or other input means (not shown). Further, headset 707 and microphone 710 may be replaced by a device similar to a telephone hand set or other hardware designed to receive, transmit, and reproduce sound (e.g., internal microphone and speaker).

Headset 707 and microphone 710 may provide and receive sound information to and from VON interface 705 through I/O interface 715. I/O interface may include, for example, a plug and jack style connection or wireless connections such as infrared and radio frequency (RF) technologies (e.g., Bluetooth®). Video display 712 may present options associated with VON communications as well as other content provided to VON interface 705. Video display 712 may be a touch-screen display, a standard video monitor, or any other display device.

Network interface 730 may provide for connectivity between VON interface 705 and hospitality system 100. For example, a connection to hospitality system 100 may be used in order to facilitate entertainment and guest location services, VON services, etc. Network interface 730 may provide for additional connectivity, for example, to the Internet for browsing web sites.

A private branch exchange (PBX) server 735 may be connected to hospitality system 100 for interfacing with VoIP provider 740, thereby enabling VoIP calls inside and outside the hospitality facility. PBX server 735 may be a computer server or hardware designed specifically for performing IP PBX functions. PBX server 735 may perform functions similar to those performed by other PBX devices (e.g., switching and line sharing) as well as performing functions consistent with VoIP services (e.g., conversion of voice data to digital data and transmission of digitized voice data).

Content provider 745 may be configured to provide content including, for example, sporting events, television programs, and music to VON client hardware 700. Content may be provided by content provider 745 over hospitality system 100 to VON interface 705 through network interface 730. Further, content provider 745 may be, for example, a server internal to the hospitality facility, an external content source, or any other provider configured to deliver content. In addition, content provider 745 may consist of one or a combination of computers, receivers, transmitters, etc.

For purposes of simplifying the following discussion in reference to FIG. 8, functionality will primarily be discussed in reference to VON client hardware 700 as installed at a client terminal 104 with identification services being performed by receiving device 206 in client terminal 104 unless otherwise noted. One of skill in the art will recognize that the methods and functions described generally would apply to VON client hardware 700 installed and operated at a service client terminal 108, in a guest's hotel room, as a stand alone device, and any other method of operation consistent with embodiments of the present invention. Further, one of skill in the art will recognize that VON client hardware 700 may provide independent identification and authentication functionality.

FIG. 8 is a block diagram depicting an exemplary process for providing audio/video information and VON services consistent with an embodiment of the present invention. Similar to other embodiments discussed herein, after opening a services account and obtaining a guest ID card, a guest wishing to play games may log onto a patron client terminal 104 by inserting the ID card into the available magnetic card reader (step 800). Alternatively, the system may not require player ID cards, and the guest may simply enter his/her assigned services account number using a data entry device. Further, a guest without a services account may log onto any client terminal using a unique identifier or ID card provided by the hospitality facility or using an anonymous login feature. Functions described with reference to FIG. 4, steps 410 and 412 may be performed to authenticate the guest and ensure proper logon.

Following a guest's logon to patron client terminal 104, the guest may begin to use the voice over network and/or entertainment services by activating VON interface 705 (step 805). In one embodiment, the hospitality facility may provide a guest with a headset style microphone/headphone combination as shown by headset 707 and microphone 710 (similar to devices readily available in the market). Upon connecting such a device to I/O interface 715, VON interface 705 may recognize that the guest wishes to utilize VON or personal entertainment services. VON interface 705 may then cause options related to such services to be displayed on video display 712. For example, upon connecting a microphone and headphone combination, video display 712 may display options including, for example, "initiate a call," "listen to music," and "watch television." Alternatively, such options may be provided to the guest in an audio format via headset 707 or other sound reproduction devices (e.g., speakers). Where VON interface 705 is configured for voice recognition, the guest may communicate option selections via microphone 710. VON interface 705 may then interpret such commands using voice recognition functionality to provide the guest with the desired service. Alternatively, option selection may be accomplished through touch-screen functionality of video display 712, a data entry device, or other data entry method consistent with embodiments of the present invention.

Once presented with options, a guest wishing to make a call may select the option to initiate a call with a contact (step 810). For example, a guest who recently struck the jackpot on a client terminal may wish to contact a friend to discuss the good news. The guest may not want to lose the client terminal believed to be "on a roll" (i.e., paying out frequently) but such a guest may not have access to a standard cell or telephone. The guest may initiate a call with a contact through VON interface 705 without leaving the current client terminal and while continuing to play games on the client terminal.

Upon receiving a selection to initiate a call, VON interface 705 may prompt the guest with additional options, for example, "locate a guest/add a contact," "dial a phone number," or "cancel." A guest wanting to speak with another guest within the hospitality facility may select the "locate a guest/ add a contact" option to establish a call to a specified contact within the hospitality facility (e.g., a friend playing video blackjack in a separate area).

Upon receiving a selection to locate a guest, VON interface 705 may prompt the guest to identify a contact to be called or added to the guest's address book. Contact information associated with a contact may consist of, for example, a typed name for the contact, a selection from a displayed list (e.g., an address book or currently available listing), the contact's unique identifier, or other identifying information associated with a contact. The guest may input a contact selection using methods including, for example, touch-screen selection on video display 712 and, where VON interface 705 is configured for voice recognition, vocal command spoken by the guest into microphone 710 (step 815).

In one example consistent with an embodiment of the present invention, a guest at a client terminal may create an address book associated with her guest ID stored within database 306 as discussed in reference to FIG. 3. The guest may then "add a contact" to the address list by specifying identifying information related to a contact as discussed above. Once entered, the guest may save the contact's information to her address book and continue locating the contact for a call.

Alternatively, a guest may create an address book upon registration with the hospitality facility specifying, for example, all contacts for the guest's address book and other patrons from whom the guest agrees to accept calls (i.e., who may locate the guest). Upon selecting the option to "locate a guest," the guest's previously created address book entries may be displayed on video display 712. The guest may then select a contact from the listing of available entries and, where that contact has agreed to accept calls from the guest, continue the initiation of a call. Contact entry and address book creation, are discussed in greater detail above with reference to FIGS. 3-4.

In another embodiment, entries from an address book may be presented to a guest in an audio format via headset 707 or other audio reproduction devices (e.g., speakers). Where VON interface 705 is configured for voice recognition, the guest may simply speak the contact information after hearing the entry for the desired contact. Alternatively, the guest may select a contact by, for example, pressing an associated input on a data entry device or other selection device upon hearing the desired contact information.

Upon receiving the contact selection (step 815), the VON interface 705 may determine that a VON call inside the hospitality facility is being initiated requiring location of a recipient. VON interface 705 may then connect to hospitality system 100 and attempt to locate the specified recipient at a client terminal within the hospitality facility (step 816). Locating a guest within a hospitality facility is discussed in greater detail above with reference to FIGS. 5 and 6A-6I.

Once a recipient has been located within the hospitality facility (e.g., at a client terminal or dining area), hospitality system 100 may provide connection information (e.g., phone number, terminal ID, IP address, etc.) to VON interface 705 thereby enabling a VON connection to the located recipient's client terminal for a VON "call" (step 817).

Upon establishment of a VON connection, VON interface 705 installed at recipient's client may alert the recipient that another guest is trying to reach them. For example, upon locating the requested recipient and establishing a connection, the recipient may hear a "ring-tone" similar to a telephone or cell phone, alerting the contact that someone is attempting to call. The contact may choose to "answer" the call and talk with the guest, or simply ignore the call as one might ignore a telephone call. Caller identification services (e.g., guest's name and location) may also be provided to the contact via video display 712 or other method so that a guest/contact may make a determination as to whether the call should be answered.

A guest may also wish to call a contact inaccessible via a client terminal, but who has access to a telephone or cell phone. In such a case, the guest may select the option to dial a telephone number. For example, the guest may wish to contact her spouse at home to inform the spouse of recent winnings at the client terminal. Such a guest may input a standard telephone number using video display 712, a data entry device, or any other method for inputting a telephone number consistent with embodiments of the present invention (step 815).

VON interface 705 may then determine that the guest is initiating a VoIP call outside the hospitality facility requiring a connection to VoIP provider 740. VON interface 705 may connect to VoIP provider 740, for example, through hospitality system 100 to PBX server 735 and then to VoIP provider 740 (step 817). Alternatively, a connection to VoIP provider 740 may occur directly through hospitality system 100 bypassing PBX server 735.

Once a connection to VoIP provider 740 has been established, VoIP provider 740 may establish a connection to the phone associated with the contact telephone number entered by the guest, similarly to a typical telephone or cell phone call. Using the example from above, a guest dialing her home telephone number may cause VoIP provider 740 to establish a connection with the telephone associated with the entered number. Similar to a standard telephone call, such a connection may cause the telephone to provide an alert as to an incoming call (e.g., "ring"). Upon answering the telephone, the spouse and the guest may converse just as if there were two standard telephones involved.

One of skill in the art will recognize that many variations within the scope of the present invention are possible. For example, a hospitality facility may wish to charge a fee for all calls, only calls outside the hospitality facility, or only long distance calls. In an embodiment where a guest is charged for long distance calls, a guest making a long distance call from the client terminal may be charged for the call at a long distance rate based on time. Such charges may be applied to the balance available within the guest's account (e.g., associated with the guest's ID card) or may be paid by the guest upon checkout of the hospitality facility. Additionally, a guest may be "called" at a client terminal via telephone with hospitality system 100 determining a guest's location (e.g., client terminal ID) and using VoIP to transmit the incoming call through PBX server 735 to VON interface 705.

In another embodiment consistent with the present invention, a guest may wish to experience selected audio or video content while continuing to play games at patron client terminal 104. For example, a guest may wish to watch a football game or interact with other content (e.g., watch a drawing of keno balls in another location) provided while continuing to play a game (e.g., video blackjack) at the client terminal.

After activating the input/output components of VON interface 705 (step 805) the guest may select an option to receive content (step 820). Content options may include, for example, live feeds from entertainment venues of the hospitality facility, outside entertainment (e.g., sporting events), music, interactive video phone conversations, etc. A guest may select an option using, for example, touch-screen functionality of video display 712, data entry device, or, where VON interface 705 is configured for voice recognition, a vocal command.

Upon selecting a content option, a connection to content provider 745 may be established by VON interface 705 through hospitality system 100 or other connection method (step 825). The content may then be displayed on video display 712, reproduced via headset 707, or any other method enabling a guest to experience the content. For example, where a guest has selected to view a particular film, VON interface 705 may connect to content provider 745 (e.g., a film server capable of streaming the selected film) over hospitality system 100. Content provider 745 may then receive the film request and cause the content to be transmitted to guest's VON interface 705 and displayed on video display 712. In another embodiment, where the guest has selected to listen to music, VON interface 705 may connect to content provider 745 functioning as a music server through hospitality system 100. Content provider 745 may then receive the request and cause music to be transmitted to VON interface 705.

The hospitality facility may also use the VON hardware to provide targeted content including, for example, advertisements, notification of resort events, and announcements to guests. For example, the hospitality facility may wish to inform guests who indicated an interest in a particular event (e.g., a musical performance in the entertainment venue), that such an event is scheduled to occur in five minutes. The hospitality facility may broadcast this message via hospitality system 100 to VON interface 705 (step 830). A determination may then be made by VON interface 705, hospitality system 100, or other system configured for making such a determination, based on preferences stored for the current guest's account, whether the broadcast message should be presented to the current guest (e.g., via headset 707 or video display 712) (step 835). For example, a guest who indicated an interest in a musical performance may have a flag set in database 306 indicating that the guest wishes to receive messages about musical performances. Upon receiving an announcement related to musical performance start times, VON interface 705 may make a request to database 306 to determine if the currently logged in user would like to receive messages like the current message.

Alternatively, a tour operator may submit a list of contact information for tour members and a message, e.g., "ABC Tour bus leaves in 15 minutes." In this case, the message would be sent to all listed tour members.

Where a determination is made that the guest has an interest in a particular message, VON interface 705 may provide such a message via VON to the guest (step 840) and presented using, for example, video display 712, headset 707, or other device capable of presenting the message.

One of skill in the art will recognize that such functionality may also be used for providing targeted advertising and merchandise offers based on past guest selections and indicated preferences as well as important announcements including, for example, tour bus departures and emergency information.

Alternatively, hospitality system 100 may cause a targeted content message to be transmitted via VoIP to a guest's registered telephone number, thereby enabling the guest to receive such content while away from a client terminal. Using the example from above, the hospitality facility may wish to inform guests who indicated an interest in a particular event (e.g., a musical performance in the entertainment venue), that such an event is scheduled to occur in five minutes. The hospitality facility may transmit the message to server 110 or other system for determination, based on preferences stored for the current guest's account, whether the message should be presented to a guest via the guest's registered telephone number.

Upon determining that a particular guest has an interest in such a message (e.g., flag in database 306 indicating an interest), server 110 may "dial" the guest's registered telephone number using a VoIP connection. The guest may then answer the call and receive the targeted message. The connection may be established through hospitality system 100 through PBX 735 to VoIP provider 740. Alternatively, the call may be made exclusively within the hospitality facility (e.g., to the guest's room telephone) over hospitality system 100 using VoIP. In another embodiment, a guest may request not to receive any messages.

This description describes the presently preferred embodiments and methods consistent with the present invention, but those skilled in the art will recognize that various changes and modifications may be made, and equivalents may be substituted without departing from the scope and spirit of the invention. Therefore, this invention should not be limited to the particular embodiments and methods disclosed herein, but that the invention include all embodiments falling within the scope of the appended claims.

For example, the content system has been described as allowing access to any options available to a particular guest. However, one of ordinary skill would appreciate that content options may be customized to a particular guest based on past selections or on request by a guest to add or eliminate options from presentment.

Further, one of skill in the art will recognize that other embodiments may include modifications to the described systems and methods such that a guest may communicate via both audio and video (e.g., video-phone) simultaneously, thereby further enhancing the social experience without leaving a terminal.

The above-noted features, other aspects, and principles of the present invention may be implemented in various system or network configurations to provide automated and computational tools to locate, communicate, and provide content to a patron. Such configurations and applications may be specially constructed for performing the various processes and operations of the invention or they may include a general purpose computer or computing platform selectively activated or reconfigured by program code to provide the functionality. The processes disclosed herein are not inherently related to any particular computer or other apparatus, and may be implemented by a suitable combination of hardware, software, and/or firmware. For example, various general purpose machines may be used with programs written in accordance with teachings of the invention, or it may be more convenient to construct a specialized apparatus or system to perform the required methods and technique.

The present invention also relates to computer readable media that include program instruction or program code for performing various computer-implemented operations based on the methods and processes of the invention. The media and program instructions may be those specially designed and constructed for the purposes of the invention, or they may be of the kind well-known and available to those having skill in the computer software arts. The media may take many forms including, but not limited to, non-volatile media, volatile media, and transmission media. Non-volatile media includes, for example, optical or magnetic disks. Volatile media includes, for example, dynamic memory. Transmission media includes, for example, coaxial cables, copper wire, and fiber optics. Transmission media can also take the form of acoustic or light waves, such as those generated during radio-wave and infra-red data communications. Examples of program instructions include both machine code, such as produced by compiler, and files containing a high level code that can be executed by the computer using an interpreter.

Furthermore, while the foregoing description related to patrons and hospitality facilities, the present invention is not limited to a patrons and hospitality facilities. For example, the present invention may be used in a similar manner to locate, communicate, and provide content to employees of the hospitality facility or employees in an organization.

Therefore, this invention should not be limited to the particular embodiments and methods disclosed herein, but that the invention include all embodiments falling within the scope of the appended claims.

We claim:

1. A method for providing communication services for a guest at a hospitality facility including a network, a server, and a plurality of terminals, the method comprising:
   receiving, via a first of the plurality of terminals, a guest identifier associated with the guest, wherein the plurality of terminals is configured to present wagering games;
   authenticating the guest using the guest identifier;
   receiving, from the guest via the first of the plurality of terminals, contact information associated with a contact;
   determining, based on the contact information, a connection method from a plurality of connection methods; and
   after the authenticating the guest, establishing, based on the connection method and the contact information, a connection between the first terminal and a second of the plurality of terminals, wherein the second of the plurality of terminals is associated with the contact, wherein the connection is configured to transmit sound information.

2. The method of claim 1, wherein the determining a connection method further comprises:
   determining whether the contact is within the hospitality facility; and
   determining whether the contact is logged in to one of the plurality of terminals.

3. The method of claim 2, further comprising:
   locating, by the server, the contact within the hospitality facility.

4. The method of claim 1, wherein the connection is established using voice over Internet protocol.

5. The method of claim 1, wherein the connection is telephonic.

6. The method of claim 1, wherein the sound information consists of at least one of a voice, music, electronically generated speech, and a soundtrack.

7. The method of claim 1, wherein the contact information consists of at least one of a contact telephone number, a contact username, a contact user location, and a contact user number.

8. The method of claim 1, wherein the contact is located at a second terminal of the plurality of terminals.

9. The method of claim 1, wherein the contact is located outside the hospitality facility.

10. The method of claim 1, wherein the connection is established through a device configured as a private branch exchange.

11. A method for providing content to a guest within a hospitality facility including a network, a server, and a plurality of terminals, the method comprising:
    receiving a guest identifier generated by the hospitality facility and associated with the guest;
    receiving a content selection from the guest;
    determining the guest is authorized to receive the selected content;
    after determining the guest is authorized, transmitting the selected content, via a voice over network protocol, to a terminal within the hospitality facility based on the content selection; and
    outputting the selected content to an output device at the terminal.

12. The method of claim 11, wherein the content comprises of at least one of audio and video.

13. The method of claim 11, wherein the voice over network protocol is voice over Internet protocol.

14. The method of claim 11, further comprising: receiving the selected content from a third-party content provider.

15. A method for providing targeted content to a guest within a hospitality facility including a network, a server, and a plurality of terminals, the method comprising:
    receiving, via one of the plurality of terminals, a guest identifier associated with the guest;
    identifying preference information associated with the guest identifier;
    generating a message comprising the targeted content;
    determining the targeted content is suitable for to the guest based on the preference information associated with the guest and the targeted content; and
    transmitting, via the network, the message to the one of the plurality of terminals.

16. The method of claim 15, wherein the targeted content consists of at least one of audio content and video content.

17. The method of claim 15, wherein the targeted content is transmitted using voice over Internet protocol.

18. The method of claim 15, wherein the targeted content comprises at least one of an advertisement, an announcement, and an offer.

19. The method of claim 15, wherein the preference information is identified based on a guest profile maintained by the hospitality facility.

20. The method of claim 15, further comprising: receiving content from a third-party content provider.

21. A system for providing communication services for patrons at a hospitality facility, comprising:
    a first terminal configured to transmit contact information and a patron identifier associated with a patron at the first terminal, wherein the first terminal is configured to present wagering games;
    a server configured to receive the patron identifier and the contact information from the first terminal, authenticate the patron using the patron identifier, determine a location of a contact based on the contact information, and establish a communication link between the patron at the first terminal and the determined location of the contact, wherein the communication link is configured to transmit sound information; and
    a network communicatively connected to the first terminal, the server, and the determined location of the contact.

22. The system of claim 21, further comprising: a content device configured to provide content to the first terminal.

23. The system of claim 22, wherein the content device is maintained by a third-party content provider.

24. The system of claim 21, further comprising: a component configured to provide voice over Internet protocol services.

25. The system of claim 24, wherein the component is maintained by a third party voice over Internet protocol provider.

26. The system of claim 21, wherein the sound information comprises at least one of a voice, music, electronically generated speech, and a soundtrack.

27. The system of claim 21, wherein the communication link is further configured to permit bidirectional communication between the patron and the contact.

28. The system of claim 21, wherein the first terminal includes a user interface device.

29. The system of claim 28, wherein the user interface device comprises a microphone and a sound reproduction device.

30. The system of claim 29, wherein the sound reproduction device consists of at least one of a speaker or a headset.

31. The system of claim 29, wherein the user interface further comprises a display screen and a data entry device.

32. The system of claim 21, wherein the communication link is telephonic.

* * * * *